US012733048B2

(12) United States Patent
Baek et al.

(10) Patent No.: US 12,733,048 B2
(45) Date of Patent: Sep. 8, 2026

(54) METHOD AND DEVICE FOR PERFORMING TID-TO-LINK MAPPING IN WIRELESS LAN SYSTEM

(71) Applicant: LG ELECTRONICS INC., Seoul (KR)

(72) Inventors: Sunhee Baek, Seoul (KR); Insun Jang, Seoul (KR); Jinsoo Choi, Seoul (KR); Jiin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 202 days.

(21) Appl. No.: 18/573,547

(22) PCT Filed: Jun. 22, 2022

(86) PCT No.: PCT/KR2022/008825
§ 371 (c)(1),
(2) Date: Dec. 22, 2023

(87) PCT Pub. No.: WO2022/270886
PCT Pub. Date: Dec. 29, 2022

(65) Prior Publication Data

US 2024/0306224 A1 Sep. 12, 2024

(30) Foreign Application Priority Data

Jun. 22, 2021 (KR) ........................ 10-2021-0081124

(51) Int. Cl.
*H04W 76/11* (2018.01)
*H04W 76/15* (2018.01)
*H04W 84/12* (2009.01)

(52) U.S. Cl.
CPC ............ *H04W 76/11* (2018.02); *H04W 76/15* (2018.02); *H04W 84/12* (2013.01)

(58) Field of Classification Search
CPC ..... H04W 84/12; H04W 76/15; H04W 76/11; H04W 52/0216; H04W 28/0263; H04W 72/1263; H04W 76/20; H04W 74/00
See application file for complete search history.

(56) References Cited

U.S. PATENT DOCUMENTS

2020/0163141 A1 5/2020 Hsu et al.
2021/0014776 A1 1/2021 Patil et al.
(Continued)

OTHER PUBLICATIONS

PCT International Application No. PCT/KR2022/008825, International Search Report dated Oct. 12, 2022, 3 pages.
(Continued)

*Primary Examiner* — Allahyar Kasraian
(74) *Attorney, Agent, or Firm* — LEE, HONG, DEGERMAN, KANG & WAIMEY

(57) ABSTRACT

A method and a device for performing TID-to-link mapping in a wireless LAN system are disclosed. A method of performing link management by an STA MLD in a wireless LAN system may comprise the steps of: receiving a first frame including first information related to link mapping of a plurality of TIDS from an AP MLD; and transmitting, to the AP MLD, a second frame including second information indicating whether to request updating of link mapping of at least one TID among the plurality of TIDs and third information related to updating of link mapping of the at least one TID.

8 Claims, 15 Drawing Sheets

(56) References Cited

U.S. PATENT DOCUMENTS

| | | | | |
|---|---|---|---|---|
| 2023/0164859 | A1* | 5/2023 | Jang | H04W 76/11 370/328 |
| 2023/0209536 | A1* | 6/2023 | Guo | H04W 72/1263 370/329 |
| 2023/0337293 | A1* | 10/2023 | Kim | H04W 74/006 |
| 2023/0413331 | A1* | 12/2023 | Lu | H04W 52/0216 |
| 2024/0040428 | A1* | 2/2024 | Kim | H04L 45/24 |
| 2024/0114573 | A1* | 4/2024 | Ko | H04W 76/15 |

OTHER PUBLICATIONS

Seok et al., "Proposed Draft Text for MLO TID-to-link Mapping," IEEE 802.11-21/0019r10, Apr. 2021, 12 pages.

Cariou et al., "Resolutions for CC34 CIDs for MLO TID to link mapping subclause," IEEE 802.11-21/0282r6, Apr. 2021, 14 pages.

Huang et al., "TID-to-Link Mapping Negotiation," IEEE 802.11-20/1551r2, Dec. 2020, 11 pages.

Mehrnoush et al., "Performance Evaluation of Various MLO TID Mapping Configurations," IEEE 802.11-20/1841r2, Feb. 2021, 21 pages.

Intellectual Property Office of India Application Serial No. 202417002546, Office Action dated Apr. 21, 2026, 9 pages.

Cariou et al., "Multi-link: steps for using a link," IEEE 802.11-19/1924r1, Nov. 2019, 23 pages.

Huang et al., "TID-to-Link Mapping Negotiation," IEEE 802-11-20/1511r0, Sep. 2020, 9 pages.

* cited by examiner

FIG. 1

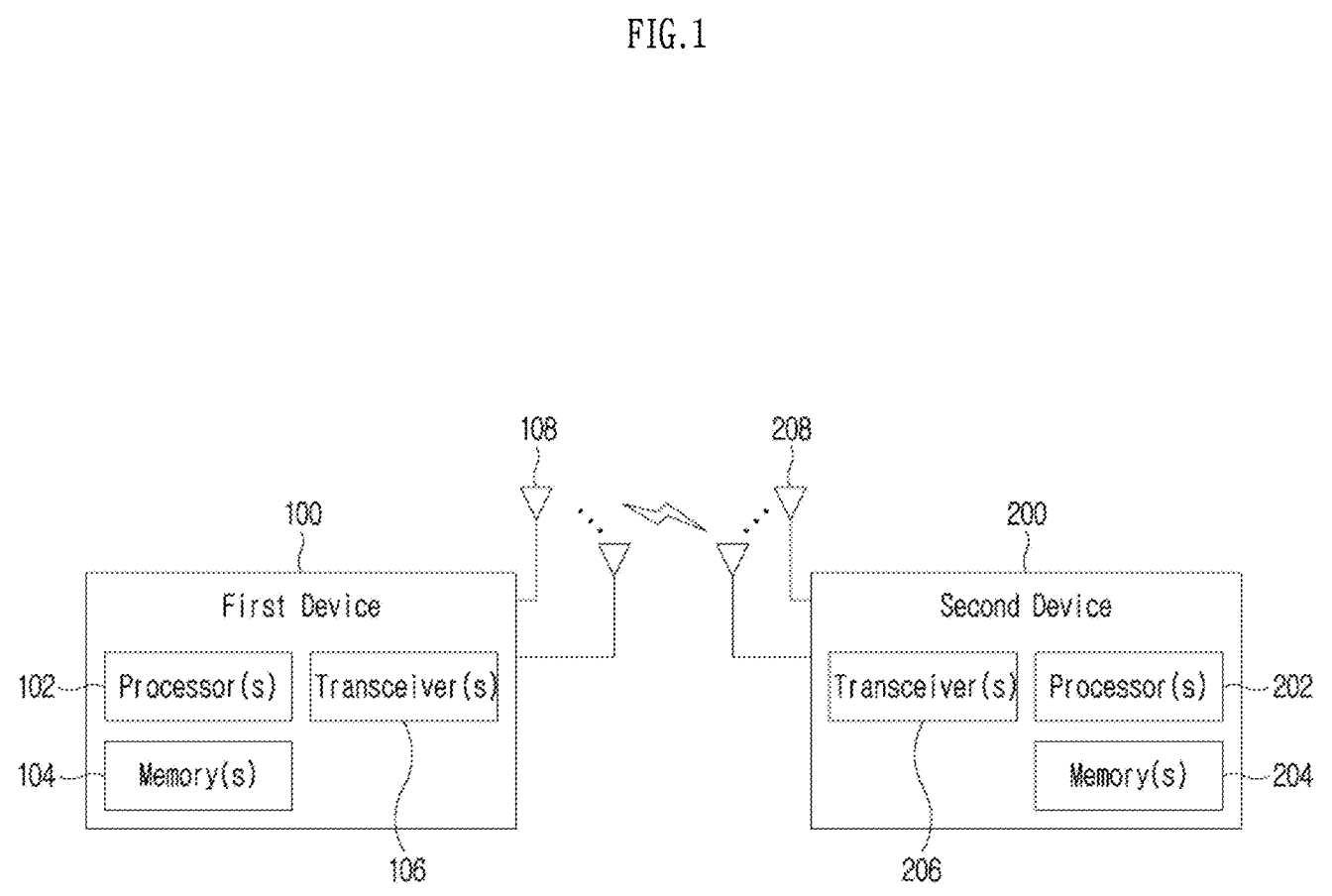

First Device 100
Processor(s) 102
Memory(s) 104
Transceiver(s) 106
108
Second Device 200
Processor(s) 202
Memory(s) 204
Transceiver(s) 206
208

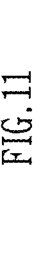
FIG.11
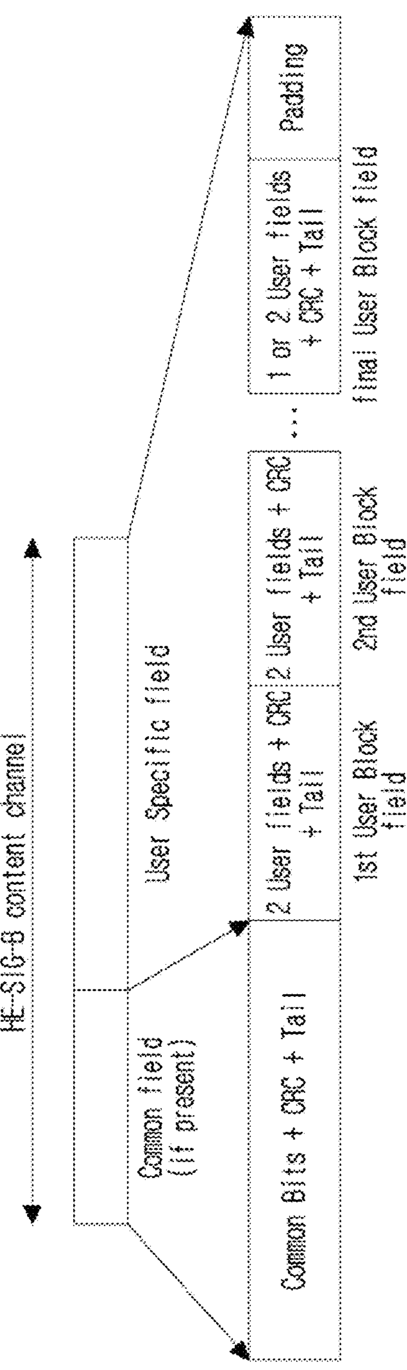

METHOD AND DEVICE FOR PERFORMING TID-TO-LINK MAPPING IN WIRELESS LAN SYSTEM

CROSS-REFERENCE TO RELATED APPLICATIONS

This application is the National Stage filing under 35 U.S.C. 371 of International Application No. PCT/KR2022/008825, filed on Jun. 22, 2022, which claims the benefit of earlier filing date and right of priority to Korean Application No. 10-2021-0081124, filed on Jun. 22, 2021, the contents of which are all hereby incorporated by reference herein in their entireties.

TECHNICAL FIELD

The present disclosure relates to a method and device for performing communication in a wireless LAN system, and more specifically, to a method and device for performing TID (traffic identifier) to link mapping during link management in a next-generation wireless LAN system.

BACKGROUND ART

New technologies for improving transmission rates, increasing bandwidth, improving reliability, reducing errors, and reducing latency have been introduced for a wireless LAN (WLAN). Among WLAN technologies, an Institute of Electrical and Electronics Engineers (IEEE) 802.11 series standard may be referred to as Wi-Fi. For example, technologies recently introduced to WLAN include enhancements for Very High-Throughput (VHT) of the 802.11ac standard, and enhancements for High Efficiency (HE) of the IEEE 802.11ax standard.

Improvement technologies for providing sensing for devices using wireless LAN signals are being discussed. For example, in IEEE 802.11 task group (TG) bf, standard technology is being developed to perform sensing of objects (e.g., people, objects, etc.) based on channel estimation using wireless LAN signals between devices operating in the frequency band below 7 GHz. Object sensing based on wireless LAN signals has the advantage of utilizing existing frequency bands and has a lower possibility of privacy infringement compared to existing sensing technologies. As the frequency range used in wireless LAN technology increases, precise sensing information can be obtained, and technologies for reducing power consumption to efficiently support precise sensing procedures are also being researched.

SUMMARY

The technical problem of the present disclosure is to provide a method and device for performing TID-to-link mapping during link management in a wireless LAN system.

The technical problem of the present disclosure is to provide a method and device for changing (or updating/re-mapping) information on a TID mapped to a link after a multi-link setup process in a wireless LAN system.

The technical problems to be achieved by the present disclosure are not limited to the above-described technical objects, and other technical problems which are not described herein will be clearly understood by those skilled in the pertinent art from the following description.

A method of performing link management by a station (STA) multi-link device (MLD) in a wireless LAN system according to an aspect of the present disclosure may include receiving, from an access point (AP) MLD, a first frame including first information related to link mapping of a plurality of traffic identifiers (TIDs); and transmitting, to the AP MLD, a second frame including second information indicating whether to request an update to the link mapping of at least one TID among the plurality of TIDs and third information related to an update of the link mapping of the at least one TID.

A method of performing link management by an access point (AP) multi-link device (MLD) in a wireless LAN system according to an aspect of the present disclosure may include transmitting, to a station (STA) MLD, a first frame including first information related to link mapping of a plurality of traffic identifiers (TIDs); and receiving, from the STA MLD, a second frame including second information indicating whether to request an update to the link mapping of at least one TID among the plurality of TIDs and third information related to an update of the link mapping of the at least one TID.

According to the present disclosure, a method and apparatus for performing TID-to-link mapping during link management in a wireless LAN system may be provided.

According to the present disclosure, a method and device for changing (or updating/re-mapping) information of a TID mapped to a link after a multi-link setup process in a wireless LAN system may be provided.

According to the present disclosure, the link mapping may be updated by exchanging frames including only the link mapping information of the TID that needs to be changed, thereby reducing the overhead caused by transmitting and receiving redundant information.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 1 illustrates a block configuration diagram of a wireless communication device according to an embodiment of the present disclosure.

FIG. 11 shows an example structure of the HE-SIG-B field.

DETAILED DESCRIPTION

Figure 2:
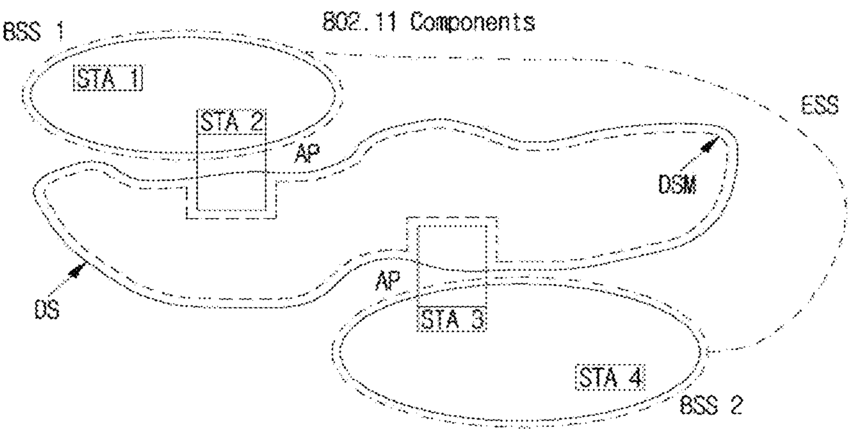
FIG. 2 is a diagram illustrating an exemplary structure of a WLAN system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

Examples of the present disclosure may be applied to various wireless communication systems. For example, examples of the present disclosure may be applied to a wireless LAN system. For example, examples of the present disclosure may be applied to an IEEE 802.11a/g/n/ac/ax standards-based wireless LAN. Furthermore, examples of the present disclosure may be applied to a wireless LAN based on the newly proposed IEEE 802.11be (or EHT) standard. Examples of the present disclosure may be applied to an IEEE 802.11be Release-2 standard-based wireless LAN corresponding to an additional enhancement technology of the IEEE 802.11be Release-1 standard. Additionally, examples of the present disclosure may be applied to a next-generation standards-based wireless LAN after IEEE 802.11be. Further, examples of this disclosure may be applied to a cellular wireless communication system. For example, it may be applied to a cellular wireless communication system based on Long Term Evolution (LTE)-based technology and 5G New Radio (NR)-based technology of the 3rd Generation Partnership Project (3GPP) standard.

Hereinafter, technical features to which examples of the present disclosure may be applied will be described.

FIG. 1 illustrates a block diagram of a wireless communication device according to an embodiment of the present disclosure.

The first device 100 and the second device 200 illustrated in FIG. 1 may be replaced with various terms such as a terminal, a wireless device, a Wireless Transmit Receive Unit (WTRU), an User Equipment (UE), a Mobile Station (MS), an user terminal (UT), a Mobile Subscriber Station (MSS), a Mobile Subscriber Unit (MSU), a subscriber station (SS), an advanced mobile station (AMS), a wireless terminal (WT), or simply user, etc. In addition, the first device 100 and the second device 200 include an access point (AP), a base station (BS), a fixed station, a Node B, a base transceiver system (BTS), a network, It may be replaced with various terms such as an Artificial Intelligence (AI) system, a road side unit (RSU), a repeater, a router, a relay, and a gateway.

The devices 100 and 200 illustrated in FIG. 1 may be referred to as stations (STAs). For example, the devices 100 and 200 illustrated in FIG. 1 may be referred to by various terms such as a transmitting device, a receiving device, a transmitting STA, and a receiving STA. For example, the STAs 110 and 200 may perform an access point (AP) role or a non-AP role. That is, in the present disclosure, the STAs 110 and 200 may perform functions of an AP and/or a non-AP. When the STAs 110 and 200 perform an AP function, they may be simply referred to as APs, and when the STAs 110 and 200 perform non-AP functions, they may be simply referred to as STAs. In addition, in the present disclosure, an AP may also be indicated as an AP STA.

Referring to FIG. 1, the first device 100 and the second device 200 may transmit and receive radio signals through various wireless LAN technologies (e.g., IEEE 802.11 series). The first device 100 and the second device 200 may include an interface for a medium access control (MAC) layer and a physical layer (PHY) conforming to the IEEE 802.11 standard.

In addition, the first device 100 and the second device 200 may additionally support various communication standards (e.g., 3GPP LTE series, 5G NR series standards, etc.) technologies other than wireless LAN technology. In addition, the device of the present disclosure may be implemented in various devices such as a mobile phone, a vehicle, a personal computer, augmented reality (AR) equipment, and virtual reality (VR) equipment, etc. In addition, the STA of the present specification may support various communication services such as a voice call, a video call, data communication, autonomous-driving, machine-type communication (MTC), machine-to-machine (M2M), device-to-device (D2D), IoT (Internet-of-Things), etc.

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including instructions for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless LAN technology (e.g., IEEE 802.11 series). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including instructions for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless LAN technology (e.g., IEEE 802.11 series). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, an instruction and/or a set of instructions.

One or more memories 104, 204 may be connected to one or more processors 102, 202 and may store data, a signal, a message, information, a program, a code, an indication and/or an instruction in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

For example, one of the STAs 100 and 200 may perform an intended operation of an AP, and the other of the STAs 100 and 200 may perform an intended operation of a non-AP STA. For example, the transceivers 106 and 206 of FIG. 1 may perform a transmission and reception operation of a signal (e.g., a packet or a physical layer protocol data unit (PPDU) conforming to IEEE 802.11a/b/g/n/ac/ax/be). In addition, in the present disclosure, an operation in which various STAs generate transmission/reception signals or perform data processing or calculation in advance for transmission/reception signals may be performed by the processors 102 and 202 of FIG. 1. For example, an example of an operation of generating a transmission/reception signal or performing data processing or calculation in advance for the transmission/reception signal may include 1) determining/acquiring/configuring/calculating/decoding/encoding bit information of fields (signal (SIG), short training field (STF), long training field (LTF), Data, etc.) included in the PPDU, 2) determining/configuring/acquiring time resources or frequency resources (e.g., subcarrier resources) used for fields (SIG, STF, LTF, Data, etc.) included in the PPDU; 3) determining/configuring/acquiring a specific sequence (e.g., pilot sequence, STF/LTF sequence, extra sequence applied to SIG) used for fields (SIG, STF, LTF, Data, etc.) included in the PPDU action, 4) power control operation and/or power saving operation applied to the STA, 5) Operations related to ACK signal determination/acquisition/configuration/calculation/decoding/encoding, etc. In addition, in the following example, various information (e.g., information related to fields/subfields/control fields/parameters/power, etc.) used by various STAs to determine/acquire/configure/calculate/decode/encode transmission and reception signals may be stored in the memories 104 and 204 of FIG. 1.

Hereinafter, downlink (DL) may mean a link for communication from an AP STA to a non-AP STA, and a DL PPDU/packet/signal may be transmitted and received through the DL. In DL communication, a transmitter may be part of an AP STA, and a receiver may be part of a non-AP STA. Uplink (UL) may mean a link for communication from non-AP STAs to AP STAs, and a UL PPDU/packet/signal may be transmitted and received through the UL. In UL communication, a transmitter may be part of a non-AP STA, and a receiver may be part of an AP STA.

FIG. 2 is a diagram illustrating an exemplary structure of a wireless LAN system to which the present disclosure may be applied.

The structure of the wireless LAN system may consist of be composed of a plurality of components. A wireless LAN supporting STA mobility transparent to an upper layer may be provided by interaction of a plurality of components. A Basic Service Set (BSS) corresponds to a basic construction block of a wireless LAN. FIG. 2 exemplarily shows that two BSSs (BSS1 and BSS2) exist and two STAs are included as members of each BSS (STA1 and STA2 are included in BSS1, and STA3 and STA4 are included in BSS2). An ellipse representing a BSS in FIG. 2 may also be understood as representing a coverage area in which STAs included in the corresponding BSS maintain communication. This area may be referred to as a Basic Service Area (BSA). When an STA moves out of the BSA, it may not directly communicate with other STAs within the BSA.

If the DS shown in FIG. 2 is not considered, the most basic type of BSS in a wireless LAN is an independent BSS (IBSS). For example, IBSS may have a minimal form containing only two STAs. For example, assuming that other components are omitted, BSS1 containing only STA1 and STA2 or BSS2 containing only STA3 and STA4 may respectively correspond to representative examples of IBSS. This configuration is possible when STAs may communicate directly without an AP. In addition, in this type of wireless LAN, it is not configured in advance, but may be configured when a LAN is required, and this may be referred to as an ad-hoc network. Since the IBSS does not include an AP, there is no centralized management entity. That is, in IBSS, STAs are managed in a distributed manner. In IBSS, all STAs may be made up of mobile STAs, and access to the distributed system (DS) is not allowed, forming a self-contained network.

Membership of an STA in the BSS may be dynamically changed by turning on or off the STA, entering or exiting the BSS area, and the like. To become a member of the BSS, the STA may join the BSS using a synchronization process. In order to access all services of the BSS infrastructure, the STA shall be associated with the BSS. This association may be dynamically established and may include the use of a Distribution System Service (DSS).

A direct STA-to-STA distance in a wireless LAN may be limited by PHY performance. In some cases, this distance limit may be sufficient, but in some cases, communication between STAs at a longer distance may be required. A distributed system (DS) may be configured to support extended coverage.

DS means a structure in which BSSs are interconnected. Specifically, as shown in FIG. 2, a BSS may exist as an extended form of a network composed of a plurality of BSSs. DS is a logical concept and may be specified by the characteristics of Distributed System Media (DSM). In this regard, a wireless medium (WM) and a DSM may be logically separated. Each logical medium is used for a different purpose and is used by different components. These medium are not limited to being the same, nor are they limited to being different. In this way, the flexibility of the wireless LAN structure (DS structure or other network structure) may be explained in that a plurality of media are logically different. That is, the wireless LAN structure may be implemented in various ways, and the corresponding wireless LAN structure may be independently specified by the physical characteristics of each embodiment.

A DS may support a mobile device by providing seamless integration of a plurality of BSSs and providing logical services necessary to address an address to a destination. In addition, the DS may further include a component called a portal that serves as a bridge for connection between the wireless LAN and other networks (e.g., IEEE 802.X).

The AP enables access to the DS through the WM for the associated non-AP STAS, and means an entity that also has the functionality of an STA. Data movement between the BSS and the DS may be performed through the AP. For example, STA2 and STA3 shown in FIG. 2 have the functionality of STAs, and provide a function allowing the associated non-AP STAs (STA1 and STA4) to access the DS. In addition, since all APs basically correspond to STAs, all APs are addressable entities. The address used by the AP for communication on the WM and the address used by the AP for communication on the DSM are not necessarily the same. A BSS composed of an AP and one or more STAs may be referred to as an infrastructure BSS.

Data transmitted from one of the STA(s) associated with an AP to a STA address of the corresponding AP may be always received on an uncontrolled port and may be processed by an IEEE 802.1X port access entity. In addition, when a controlled port is authenticated, transmission data (or frames) may be delivered to the DS.

In addition to the structure of the DS described above, an extended service set (ESS) may be configured to provide wide coverage.

An ESS means a network in which a network having an arbitrary size and complexity is composed of DSs and BSSs. The ESS may correspond to a set of BSSs connected to one DS. However, the ESS does not include the DS. An ESS network is characterized by being seen as an IBSS in the Logical Link Control (LLC) layer. STAs included in the ESS may communicate with each other, and mobile STAs may move from one BSS to another BSS (within the same ESS) transparently to the LLC. APs included in one ESS may have the same service set identification (SSID). The SSID is distinguished from the BSSID, which is an identifier of the BSS.

The wireless LAN system does not assume anything about the relative physical locations of BSSs, and all of the following forms are possible. BSSs may partially overlap, which is a form commonly used to provide continuous coverage. In addition, BSSs may not be physically connected, and logically there is no limit on the distance between BSSs. In addition, the BSSs may be physically located in the same location, which may be used to provide redundancy. In addition, one (or more than one) IBSS or ESS networks may physically exist in the same space as one (or more than one) ESS network. When an ad-hoc network operates in a location where an ESS network exists, when physically overlapping wireless networks are configured by different organizations, or when two or more different access and security policies are required in the same location, this may correspond to the form of an ESS network in the like.

Figure 3:
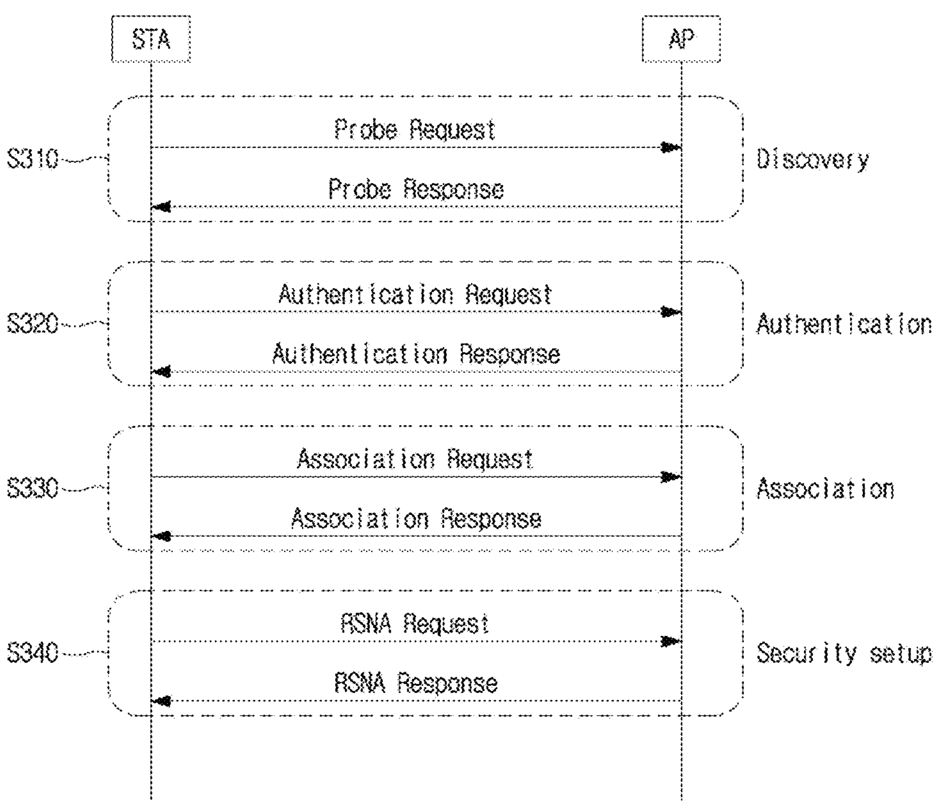
FIG. 3 is a diagram for describing a link setup process to which the present disclosure may be applied.

FIG. 3 is a diagram for explaining a link setup process to which the present disclosure may be applied.

In order for an STA to set up a link with respect to a network and transmit/receive data, it first discovers a network, performs authentication, establishes an association, and need to perform the authentication process for security. The link setup process may also be referred to as a session initiation process or a session setup process. In addition, the processes of discovery, authentication, association, and security setting of the link setup process may be collectively referred to as an association process.

In step S310, the STA may perform a network discovery operation. The network discovery operation may include a scanning operation of the STA. That is, in order for the STA to access the network, it needs to find a network in which it can participate. The STA shall identify a compatible network before participating in a wireless network, and the process of identifying a network existing in a specific area is called scanning.

Scanning schemes include active scanning and passive scanning. FIG. 3 exemplarily illustrates a network discovery operation including an active scanning process. In active scanning, an STA performing scanning transmits a probe request frame to discover which APs exist around it while moving channels and waits for a response thereto. A responder transmits a probe response frame as a response to the probe request frame to the STA that has transmitted the probe request frame. Here, the responder may be an STA that last transmitted a beacon frame in the BSS of the channel being scanned. In the BSS, since the AP transmits the beacon frame, the AP becomes a responder, and in the IBSS, the STAs in the IBSS rotate to transmit the beacon frame, so the responder is not constant. For example, a STA that transmits a probe request frame on channel 1 and receives a probe response frame on channel 1, may store BSS-related information included in the received probe response frame and may move to the next channel (e.g., channel 2) and perform scanning (i.e., transmission/reception of a probe request/response on channel 2) in the same manner.

Although not shown in FIG. 3, the scanning operation may be performed in a passive scanning manner. In passive scanning, a STA performing scanning waits for a beacon frame while moving channels. The beacon frame is one of the management frames defined in IEEE 802.11, and is periodically transmitted to notify the existence of a wireless network and to allow the STA performing scanning to find a wireless network and participate in the wireless network. In the BSS, the AP serves to transmit beacon frames periodically, and in the IBSS, STAs within the IBSS rotate to transmit beacon frames. When the STA performing scanning receives a beacon frame, the STA stores information for the BSS included in the beacon frame and records beacon frame information in each channel while moving to another channel. The STA receiving the beacon frame may store BSS-related information included in the received beacon frame, move to the next channel, and perform scanning in the next channel in the same way. Comparing active scanning and passive scanning, active scanning has an advantage of having less delay and less power consumption than passive scanning.

After the STA discovers the network, an authentication process may be performed in step S320. This authentication process may be referred to as a first authentication process in order to be clearly distinguished from the security setup operation of step S340 to be described later.

The authentication process includes a process in which the STA transmits an authentication request frame to the AP, and in response to this, the AP transmits an authentication response frame to the STA. An authentication frame used for authentication request/response corresponds to a management frame.

The authentication frame includes an authentication algorithm number, an authentication transaction sequence number, a status code, a challenge text, a robust security network (RSN), and a Finite Cyclic Group, etc. This corresponds to some examples of information that may be included in the authentication request/response frame, and may be replaced with other information or additional information may be further included.

The STA may transmit an authentication request frame to the AP. The AP may determine whether to allow authentication of the corresponding STA based on information included in the received authentication request frame. The AP may provide the result of the authentication process to the STA through an authentication response frame.

After the STA is successfully authenticated, an association process may be performed in step S330. The association process includes a process in which the STA transmits an association request frame to the AP, and in response, the AP transmits an association response frame to the STA.

For example, the association request frame may include information related to various capabilities, a beacon listen interval, a service set identifier (SSID), supported rates, supported channels, RSN, mobility domain, supported operating classes, Traffic Indication Map Broadcast request (TIM broadcast request), interworking service capability, etc. For example, the association response frame may include information related to various capabilities, status code, association ID (AID), supported rates, enhanced distributed channel access (EDCA) parameter set, received channel power indicator (RCPI), received signal to noise indicator (RSNI), mobility domain, timeout interval (e.g., association comeback time), overlapping BSS scan parameters, TIM broadcast response, Quality of Service (QOS) map, etc. This corresponds to some examples of information that may be included in the association request/response frame, and may be replaced with other information or additional information may be further included.

After the STA is successfully associated with the network, a security setup process may be performed in step S340. The security setup process of step S340 may be referred to as an authentication process through Robust Security Network Association (RSNA) request/response, and the authentication process of step S320 is referred to as a first authentication process, and the security setup process of step S340 may also simply be referred to as an authentication process.

The security setup process of step S340 may include, for example, a process of setting up a private key through 4-way handshaking through an Extensible Authentication Protocol over LAN (EAPOL) frame. In addition, the security setup process may be performed according to a security scheme not defined in the IEEE 802.11 standard.

Figure 4:
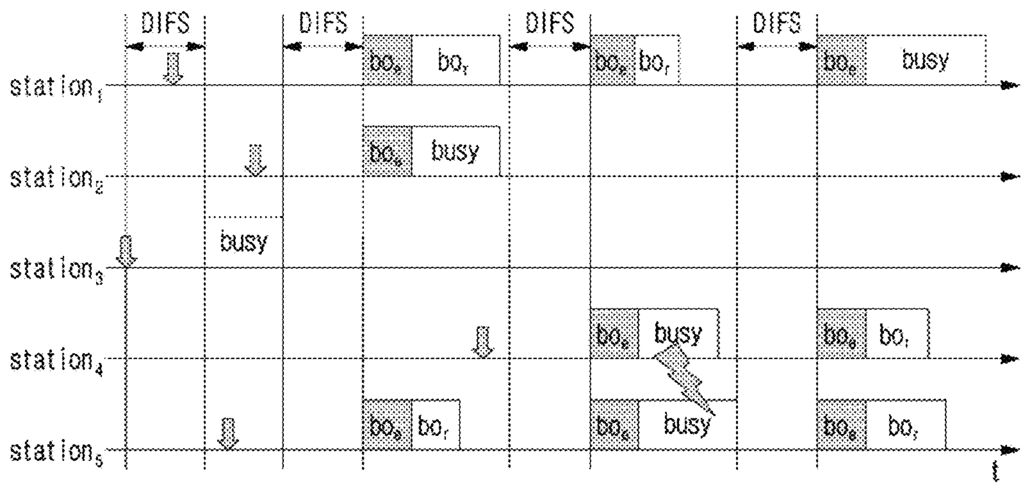
FIG. 4 is a diagram for describing a backoff process to which the present disclosure may be applied.

FIG. 4 is a diagram for explaining a backoff process to which the present disclosure may be applied.

In the wireless LAN system, a basic access mechanism of medium access control (MAC) is a carrier sense multiple access with collision avoidance (CSMA/CA) mechanism. The CSMA/CA mechanism is also called Distributed Coordination Function (DCF) of IEEE 802.11 MAC, and basically adopts a "listen before talk" access mechanism. According to this type of access mechanism, the AP and/or STA may perform Clear Channel Assessment (CCA) sensing a radio channel or medium during a predetermined time interval (e.g., DCF Inter-Frame Space (DIFS)), prior to starting transmission. As a result of the sensing, if it is determined that the medium is in an idle state, frame transmission is started through the corresponding medium. On the other hand, if it is detected that the medium is occupied or busy, the corresponding AP and/or STA does not start its own transmission and may set a delay period for medium access (e.g., a random backoff period) and attempt frame transmission after waiting. By applying the random backoff period, since it is expected that several STAs attempt frame transmission after waiting for different periods of time, collision may be minimized.

In addition, the IEEE 802.11 MAC protocol provides a Hybrid Coordination Function (HCF). HCF is based on the DCF and Point Coordination Function (PCF). PCF is a polling-based synchronous access method and refers to a method in which all receiving APs and/or STAs periodically poll to receive data frames. In addition, HCF has Enhanced Distributed Channel Access (EDCA) and HCF Controlled Channel Access (HCCA). EDCA is a contention-based access method for a provider to provide data frames to multiple users, and HCCA uses a non-contention-based channel access method using a polling mechanism. In addition, the HCF includes a medium access mechanism for improving QoS (Quality of Service) of the wireless LAN, and may transmit QoS data in both a Contention Period (CP) and a Contention Free Period (CFP).

Referring to FIG. 4, an operation based on a random backoff period will be described. When the occupied/busy medium changes to an idle state, several STAs may attempt to transmit data (or frames). As a method for minimizing collisions, each of STAs may respectively select a random backoff count and attempt transmission after waiting for a corresponding slot time. The random backoff count has a pseudo-random integer value and may be determined as one of values ranging from 0 to CW. Here, CW is a contention window parameter value. The CW parameter is given CWmin as an initial value, but may take a value twice as large in case of transmission failure (e.g., when an ACK for the transmitted frame is not received). When the CW parameter value reaches CWmax, data transmission may be attempted while maintaining the CWmax value until data transmission is successful, and when data transmission is successful, the CWmin value is reset. The values of CW, CWmin and CWmax are preferably set to 2n−1 (n=0, 1, 2, . . . ).

When the random backoff process starts, the STA continuously monitors the medium while counting down the backoff slots according to the determined backoff count value. When the medium is monitored for occupancy, it stops counting down and waits, and resumes the rest of the countdown when the medium becomes idle.

In the example of FIG. 4, when a packet to be transmitted arrives at the MAC of STA3, STA3 may transmit the frame immediately after confirming that the medium is idle as much as DIFS. The remaining STAs monitor and wait for the medium to be occupied/busy. In the meantime, data to be transmitted may also occur in each of STA1, STA2, and STA5, and each STA waits as long as DIFS when the medium is monitored as idle, and then may perform a countdown of the backoff slot according to the random backoff count value selected by each STA. Assume that STA2 selects the smallest backoff count value and STA1 selects the largest backoff count value. That is, the case where the remaining back-off time of STA5 is shorter than the remaining back-off time of STA1 at the time when STA2 completes the back-off count and starts frame transmission is exemplified. STA1 and STA5 temporarily stop counting down and wait while STA2 occupies the medium. When the occupation of STA2 ends and the medium becomes idle again, STA1 and STA5 wait for DIFS and resume the stopped backoff count. That is, frame transmission may be started after counting down the remaining backoff slots for the remaining backoff time. Since the remaining backoff time of STA5 is shorter than that of STA1, STA5 starts frame transmission. While STA2 occupies the medium, data to be transmitted may also occur in STA4. From the standpoint of STA4, when the medium becomes idle, STA4 may wait for DIFS, and then may perform a countdown according to the random backoff count value selected by the STA4 and start transmitting frames. The example of FIG. 4 shows a case where the remaining backoff time of STA5 coincides with the random backoff count value of STA4 by chance. In this case, a collision may occur between STA4 and STA5. When a collision occurs, both STA4 and STA5 do not receive an ACK, so data transmission fails. In this case, STA4 and STA5 may double the CW value, select a random backoff count value, and perform a countdown. STA1 waits while the medium is occupied due to transmission of STA4 and STA5, waits for DIFS when the medium becomes idle, and then starts frame transmission after the remaining backoff time has elapsed.

As in the example of FIG. 4, the data frame is a frame used for transmission of data forwarded to a higher layer, and may be transmitted after a backoff performed after DIFS elapses from when the medium becomes idle. Additionally, the management frame is a frame used for exchange of management information that is not forwarded to a higher layer, and is transmitted after a backoff performed after an IFS such as DIFS or Point Coordination Function IFS (PIFS). As a subtype frames of management frame, there are a Beacon, an association request/response, a re-association request/response, a probe request/response, an authentication request/response, etc. A control frame is a frame used to control access to a medium. As a subtype frames of control frame, there are Request-To-Send (RTS), Clear-To-Send (CTS), Acknowledgement (ACK), Power Save-Poll (PS-Poll), block ACK (BlockAck), block ACK request (BlockACKReq), null data packet announcement (NDP announcement), and trigger, etc. If the control frame is not a response frame of the previous frame, it is transmitted after backoff performed after DIFS elapses, and if it is a response frame of the previous frame, it is transmitted without performing backoff after short IFS (SIFS) elapses. The type and subtype of the frame may be identified by a type field and a subtype field in a frame control (FC) field.

A Quality of Service (QOS) STA may perform the backoff that is performed after an arbitration IFS (AIFS) for an access category (AC) to which the frame belongs, that is, AIFS[i] (where i is a value determined by AC), and then may transmit the frame. Here, the frame in which AIFS[i] can be used may be a data frame, a management frame, or a control frame other than a response frame.

Figure 5:
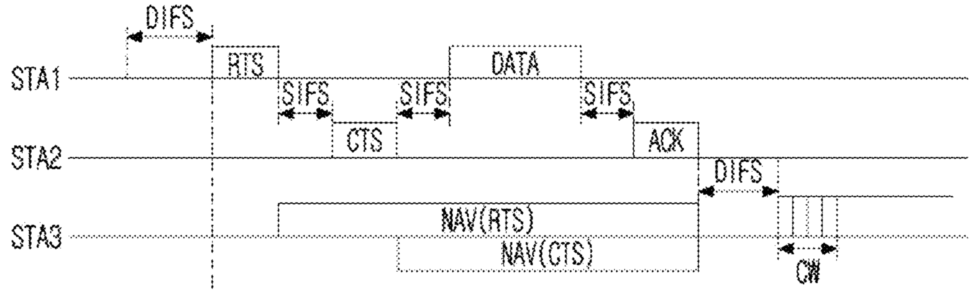
FIG. 5 is a diagram for describing a frame transmission operation based on CSMA/CA to which the present disclosure may be applied.

FIG. 5 is a diagram for explaining a frame transmission operation based on CSMA/CA to which the present disclosure may be applied.

As described above, the CSMA/CA mechanism includes virtual carrier sensing in addition to physical carrier sensing in which a STA directly senses a medium. Virtual carrier sensing is intended to compensate for problems that may occur in medium access, such as a hidden node problem. For virtual carrier sensing, the MAC of the STA may use a Network Allocation Vector (NAV). The NAV is a value indicating, to other STAs, the remaining time until the medium is available for use by an STA currently using or having the right to use the medium. Therefore, the value set as NAV corresponds to a period in which the medium is scheduled to be used by the STA transmitting the frame, and the STA receiving the NAV value is prohibited from accessing the medium during the corresponding period. For example, the NAV may be configured based on the value of the "duration" field of the MAC header of the frame.

In the example of FIG. 5, it is assumed that a STA1 intends to transmit data to a STA2, and a STA3 is in a position capable of overhearing some or all of frames transmitted and received between the STA1 and the STA2.

In order to reduce the possibility of collision of transmissions of multiple STAs in CSMA/CA based frame transmission operation, a mechanism using RTS/CTS frames may be applied. In the example of FIG. 5, while transmission of the STA1 is being performed, as a result of carrier sensing of the STA3, it may be determined that the medium is in an idle state. That is, the STA1 may correspond to a hidden node to the STA3. Alternatively, in the example of FIG. 5, it may be determined that the carrier sensing result medium of the STA3 is in an idle state while transmission of the STA2 is being performed. That is, the STA2 may correspond to a hidden node to the STA3. Through the exchange of RTS/CTS frames before performing data transmission and reception between the STA1 and the STA2, a STA outside the transmission range of one of the STA1 or the STA2, or a STA outside the carrier sensing range for transmission from the STA1 or the STA3 may not attempt to occupy the channel during data transmission and reception between the STA1 and the STA2.

Specifically, the STA1 may determine whether a channel is being used through carrier sensing. In terms of physical carrier sensing, the STA1 may determine a channel occupation idle state based on an energy level or signal correlation detected in a channel. In addition, in terms of virtual carrier sensing, the STA1 may determine a channel occupancy state using a network allocation vector (NAV) timer.

The STA1 may transmit an RTS frame to the STA2 after performing a backoff when the channel is in an idle state during DIFS. When the STA2 receives the RTS frame, the STA2 may transmit a CTS frame as a response to the RTS frame to the STA1 after SIFS.

If the STA3 cannot overhear the CTS frame from the STA2 but can overhear the RTS frame from the STA1, the STA3 may set a NAV timer for a frame transmission period (e.g., SIFS+CTS frame+SIFS+data frame+SIFS+ACK frame) that is continuously transmitted thereafter, using the duration information included in the RTS frame. Alternatively, if the STA3 can overhear a CTS frame from the STA2 although the STA3 cannot overhear an RTS frame from the STA1, the STA3 may set a NAV timer for a frame transmission period (e.g., SIFS+data frame+SIFS+ACK frame) that is continuously transmitted thereafter, using the duration information included in the CTS frame. That is, if the STA3 can overhear one or more of the RTS or CTS frames from one or more of the STA1 or the STA2, the STA3 may set the NAV accordingly. When the STA3 receives a new frame before the NAV timer expires, the STA3 may update the NAV timer using duration information included in the new frame. The STA3 does not attempt channel access until the NAV timer expires.

When the STA1 receives the CTS frame from the STA2, the STA1 may transmit the data frame to the STA2 after SIFS from the time point when the reception of the CTS frame is completed. When the STA2 successfully receives the data frame, the STA2 may transmit an ACK frame as a response to the data frame to the STA1 after SIFS. The STA3 may determine whether the channel is being used through carrier sensing when the NAV timer expires. When the STA3 determines that the channel is not used by other terminals during DIFS after expiration of the NAV timer, the STA3 may attempt channel access after a contention window (CW) according to a random backoff has passed.

Figure 6:
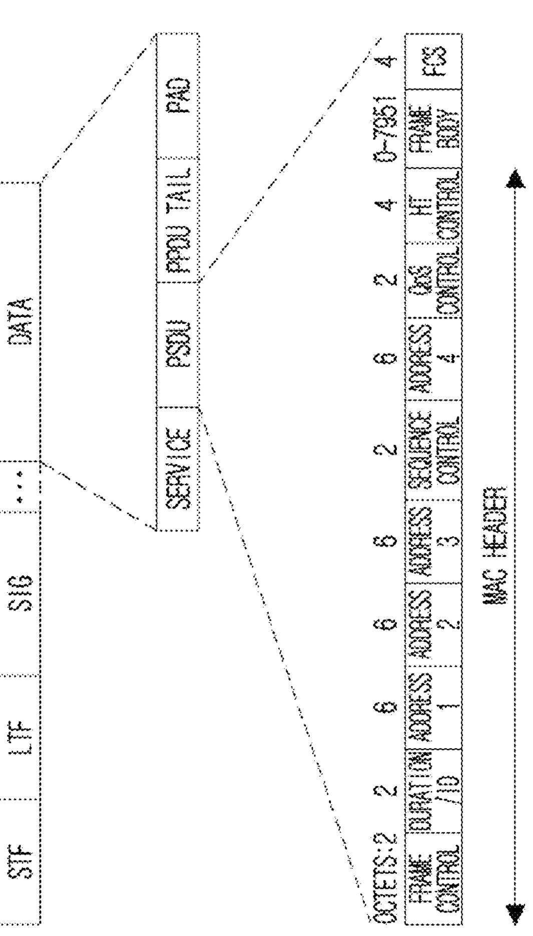
FIG. 6 is a diagram for describing an example of a frame structure used in a WLAN system to which the present disclosure may be applied.

FIG. 6 is a diagram for explaining an example of a frame structure used in a WLAN system to which the present disclosure may be applied.

By means of an instruction or primitive (meaning a set of instructions or parameters) from the MAC layer, the PHY layer may prepare a MAC PDU (MPDU) to be transmitted. For example, when a command requesting transmission start of the PHY layer is received from the MAC layer, the PHY layer switches to the transmission mode and configures information (e.g., data) provided from the MAC layer in the form of a frame and transmits it. In addition, when the PHY layer detects a valid preamble of the received frame, the PHY layer monitors the header of the preamble and sends a command notifying the start of reception of the PHY layer to the MAC layer.

In this way, information transmission/reception in a wireless LAN system is performed in the form of a frame, and for this purpose, a PHY layer protocol data unit (PPDU) frame format is defined.

A basic PPDU frame may include a Short Training Field (STF), a Long Training Field (LTF), a SIGNAL (SIG) field, and a Data field. The most basic (e.g., non-High Throughput (HT)) PPDU frame format may consist of only L-STF (Legacy-STF), L-LTF (Legacy-LTF), SIG field, and data field. In addition, depending on the type of PPDU frame format (e.g., HT-mixed format PPDU, HT-greenfield format PPDU, VHT (Very High Throughput) PPDU, etc.), an additional (or different type) STF, LTF, and SIG fields may be included between the SIG field and the data field (this will be described later with reference to FIG. 7).

The STF is a signal for signal detection, automatic gain control (AGC), diversity selection, precise time synchronization, and the like, and the LTF is a signal for channel estimation and frequency error estimation. The STF and LTF may be referred to as signals for synchronization and channel estimation of the OFDM physical layer.

The SIG field may include a RATE field and a LENGTH field. The RATE field may include information on modulation and coding rates of data. The LENGTH field may include information on the length of data. Additionally, the SIG field may include a parity bit, a SIG TAIL bit, and the like.

The data field may include a SERVICE field, a physical layer service data unit (PSDU), and a PPDU TAIL bit, and may also include padding bits if necessary. Some bits of the SERVICE field may be used for synchronization of the descrambler at the receiving end. The PSDU corresponds to the MAC PDU defined in the MAC layer, and may include data generated/used in the upper layer. The PPDU TAIL bit may be used to return the encoder to a 0 state. Padding bits may be used to adjust the length of a data field in a predetermined unit.

A MAC PDU is defined according to various MAC frame formats, and a basic MAC frame consists of a MAC header, a frame body, and a Frame Check Sequence (FCS). The MAC frame may consist of MAC PDUs and be transmitted/received through the PSDU of the data part of the PPDU frame format.

The MAC header includes a Frame Control field, a Duration/ID field, an Address field, and the like. The frame control field may include control information required for frame transmission/reception. The duration/ID field may be set to a time for transmitting a corresponding frame or the like. For details of the Sequence Control, QoS Control, and HT Control subfields of the MAC header, refer to the IEEE 802.11 standard document.

A null-data packet (NDP) frame format means a frame format that does not include a data packet. That is, the NDP frame refers to a frame format that includes a physical layer convergence procedure (PLCP) header part (i.e., STF, LTF, and SIG fields) in a general PPDU frame format and does not include the remaining parts (i.e., data field). A NDP frame may also be referred to as a short frame format.

Figure 7:
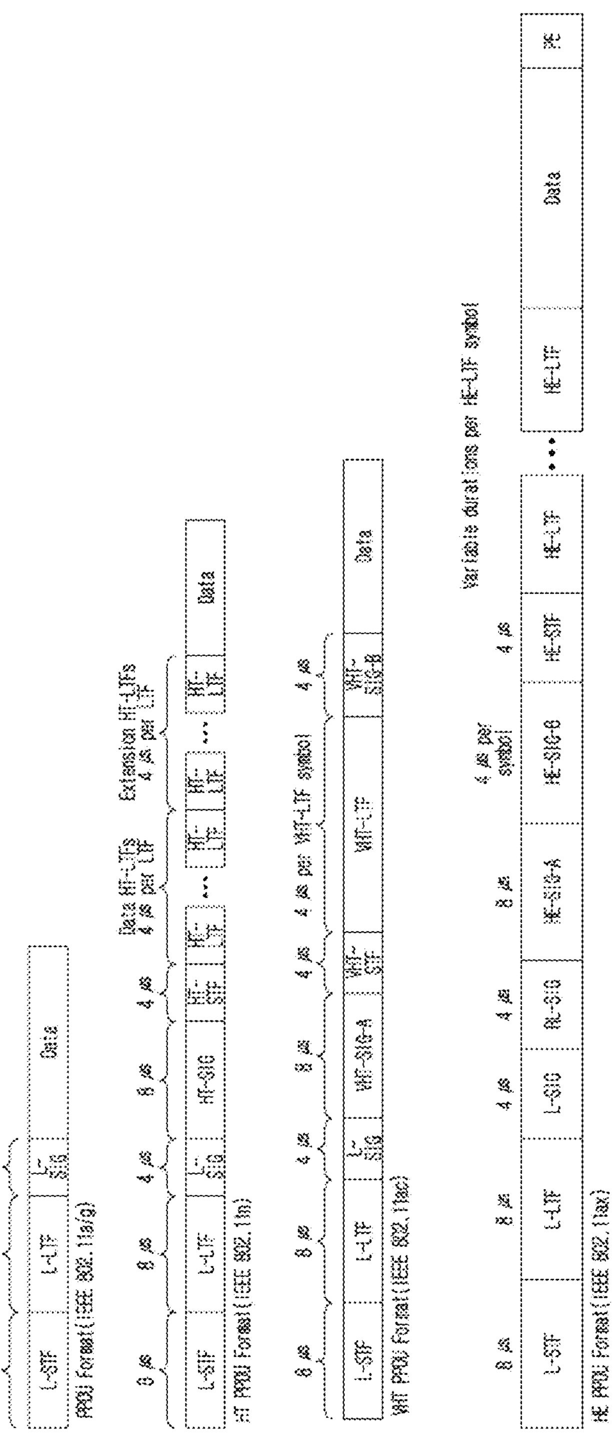
FIG. 7 is a diagram illustrating examples of PPDUs defined in the IEEE 802.11 standard to which this disclosure can be applied.

FIG. 7 is a diagram illustrating examples of PPDUs defined in the IEEE 802.11 standard to which the present disclosure may be applied.

In standards such as IEEE 802.11a/g/n/ac/ax, various types of PPDUs have been used. The basic PPDU format (IEEE 802.11a/g) includes L-LTF, L-STF, L-SIG and Data fields. The basic PPDU format may also be referred to as a non-HT PPDU format.

The HT PPDU format (IEEE 802.11n) additionally includes HT-SIG, HT-STF, and HT-LFT(s) fields to the basic PPDU format. The HT PPDU format shown in FIG. 7 may be referred to as an HT-mixed format. In addition, an HT-greenfield format PPDU may be defined, and this corresponds to a format consisting of HT-GF-STF, HT-LTF1, HT-SIG, one or more HT-LTF, and Data field, not including L-STF, L-LTF, and L-SIG (not shown).

An example of the VHT PPDU format (IEEE 802.11ac) additionally includes VHT SIG-A, VHT-STF VHT-LTF, and VHT-SIG-B fields to the basic PPDU format.

An example of the HE PPDU format (IEEE 802.11ax) additionally includes Repeated L-SIG (RL-SIG), HE-SIG-A, HE-SIG-B, HE-STF, HE-LTF(s), Packet Extension (PE) field to the basic PPDU format. Some fields may be excluded or their length may vary according to detailed examples of the HE PPDU format. For example, the HE-SIG-B field is included in the HE PPDU format for multi-user (MU), and the HE-SIG-B is not included in the HE PPDU format for single user (SU). In addition, the HE trigger-based (TB) PPDU format does not include the HE-SIG-B, and the length of the HE-STF field may vary to 8 us. The Extended Range (HE ER) SU PPDU format does not include the HE-SIG-B field, and the length of the HE-SIG-A field may vary to 16 us.

Figure 8:
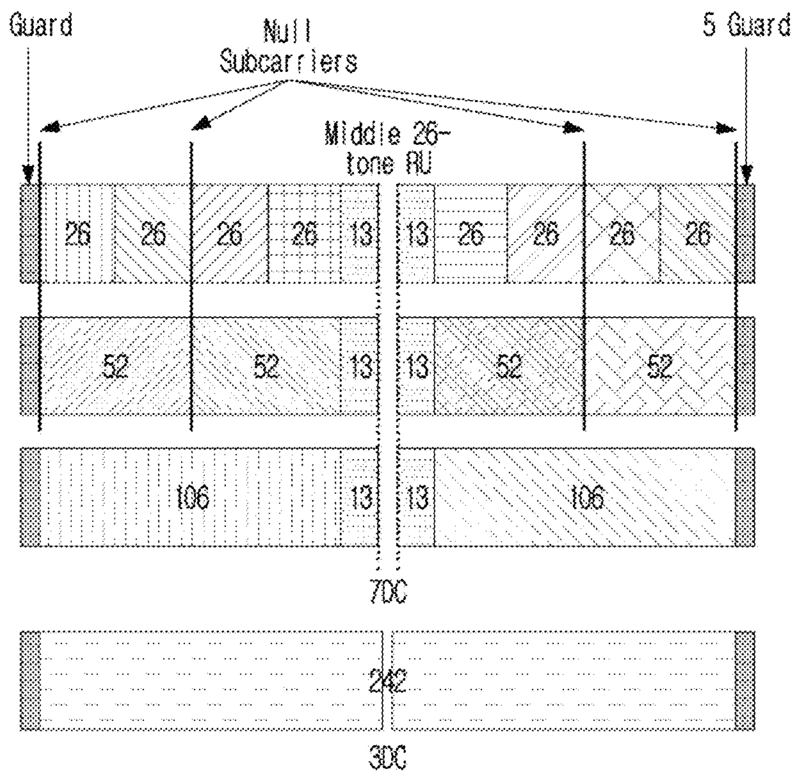
FIGS. 8 to 10 are diagrams for describing examples of resource units of a wireless LAN system to which the present disclosure may be applied.
Figure 9:
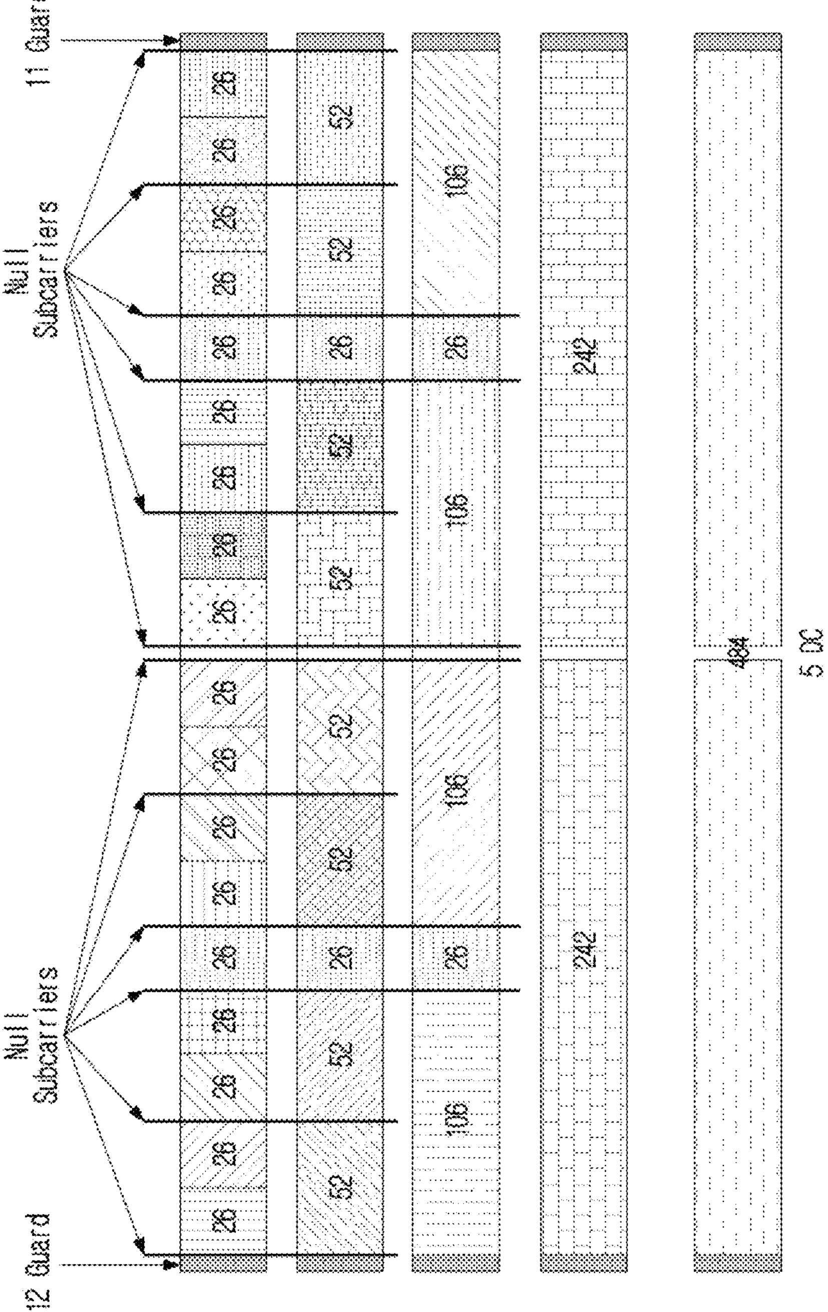
Figure 10:
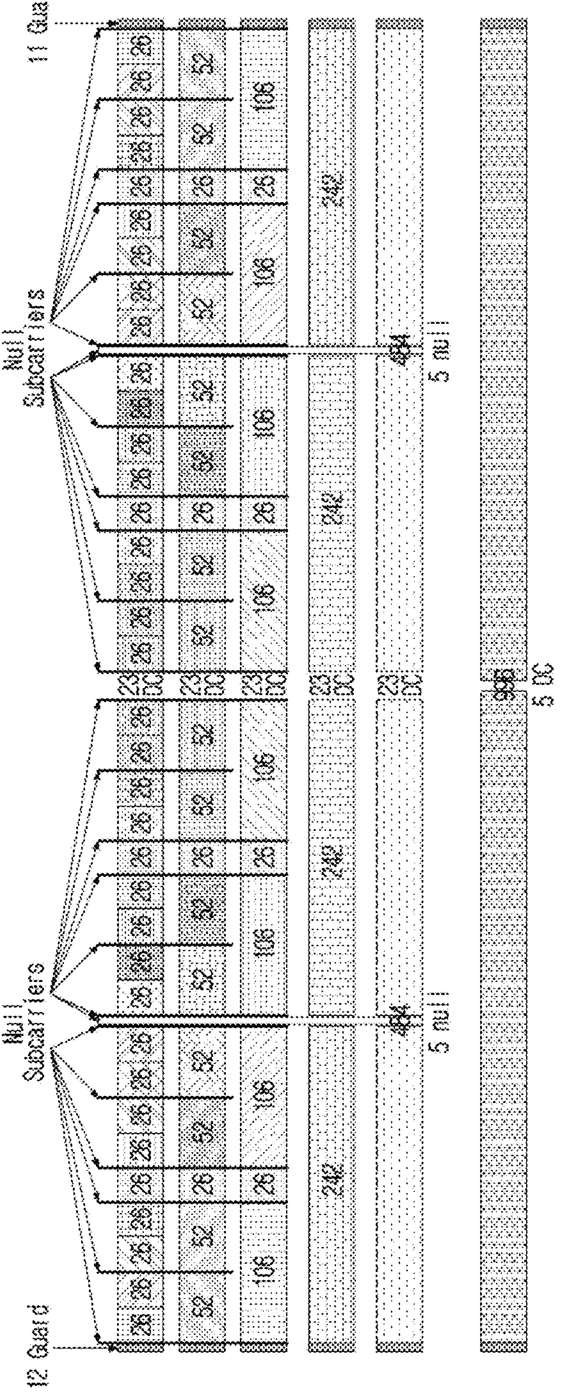

FIGS. 8 to 10 are diagrams for explaining examples of resource units of a WLAN system to which the present disclosure may be applied.

Referring to FIGS. 8 to 10, a resource unit (RU) defined in a wireless LAN system will be described, the RU may include a plurality of subcarriers (or tones). The RU may be used when transmitting signals to multiple STAs based on the OFDMA scheme. In addition, the RU may be defined even when a signal is transmitted to one STA. The RU may be used for STF, LTF, data field of the PPDU, etc.

As shown in FIGS. 8 to 10, RUs corresponding to different numbers of tones (i.e., subcarriers) are used to construct some fields of 20 MHz, 40 MHZ, or 80 MHz X-PPDUs (X is HE, EHT, etc.). For example, resources may be allocated in RU units shown for the X-STF, X-LTF, and Data field.

FIG. 8 is a diagram illustrating an exemplary allocation of resource units (RUs) used on a 20 MHz band.

As shown at the top of FIG. 8, 26-units (i.e., units corresponding to 26 tones) may be allocated. 6 tones may be used as a guard band in the leftmost band of the 20 MHz band, and 5 tones may be used as a guard band in the rightmost band of the 20 MHz band. In addition, 7 DC tones are inserted in the center band, that is, the DC band, and 26-units corresponding to each of the 13 tones may exist on the left and right sides of the DC band. In addition, 26-unit, 52-unit, and 106-unit may be allocated to other bands. Each unit may be allocated for STAs or users.

The RU allocation of FIG. 8 is utilized not only in a situation for multiple users (MU) but also in a situation for a single user (SU), and in this case, it is possible to use one 242-unit as shown at the bottom of FIG. 8. In this case, three DC tones may be inserted.

In the example of FIG. 8, RUs of various sizes, that is, 26-RU, 52-RU, 106-RU, 242-RU, etc. are exemplified, but the specific size of these RUs may be reduced or expanded. Therefore, in the present disclosure, the specific size of each RU (i.e., the number of corresponding tones) is exemplary and not restrictive. In addition, within a predetermined bandwidth (e.g., 20, 40, 80, 160, 320 MHZ, . . . ) in the present disclosure, the number of RUs may vary according to the size of the RU. In the examples of FIG. 9 and/or FIG. 10 to be described below, the fact that the size and/or number of RUs may be varied is the same as the example of FIG. 8.

FIG. 9 is a diagram illustrating an exemplary allocation of resource units (RUs) used on a 40 MHz band.

Just as RUs of various sizes are used in the example of FIG. 8, 26-RU, 52-RU, 106-RU, 242-RU, 484-RU, and the like may be used in the example of FIG. 9 as well. In addition, 5 DC tones may be inserted at the center frequency, 12 tones may be used as a guard band in the leftmost band of the 40 MHz band, and 11 tones may be used as a guard band in the rightmost band of the 40 MHz band.

In addition, as shown, when used for a single user, a 484-RU may be used.

FIG. 10 is a diagram illustrating an exemplary allocation of resource units (RUs) used on an 80 MHz band.

Just as RUs of various sizes are used in the example of FIG. 8 and FIG. 9, 26-RU, 52-RU, 106-RU, 242-RU, 484-RU, 996-RU and the like may be used in the example of FIG. 10 as well. In addition, in the case of an 80 MHZ PPDU, RU allocation of HE PPDUs and EHT PPDUs may be different, and the example of FIG. 10 shows an example of RU allocation for 80 MHZ EHT PPDUs. The scheme that 12 tones are used as a guard band in the leftmost band of the 80 MHz band and 11 tones are used as a guard band in the rightmost band of the 80 MHz band in the example of FIG. 10 is the same in HE PPDU and EHT PPDU. Unlike HE PPDU, where 7 DC tones are inserted in the DC band and there is one 26-RU corresponding to each of the 13 tones on the left and right sides of the DC band, in the EHT PPDU, 23 DC tones are inserted into the DC band, and one 26-RU exists on the left and right sides of the DC band. Unlike the HE PPDU, where one null subcarrier exists between 242-RUs rather than the center band, there are five null subcarriers in the EHT PPDU. In the HE PPDU, one 484-RU does not include null subcarriers, but in the EHT PPDU, one 484-RU includes 5 null subcarriers.

In addition, as shown, when used for a single user, 996-RU may be used, and in this case, 5 DC tones are inserted in common with HE PPDU and EHT PPDU.

EHT PPDUs over 160 MHz may be configured with a plurality of 80 MHZ subblocks in FIG. 10. The RU allocation for each 80 MHz subblock may be the same as that of the 80 MHZ EHT PPDU of FIG. 10. If the 80 MHz subblock of the 160 MHZ or 320 MHZ EHT PPDU is not punctured and the entire 80 MHz subblock is used as part of RU or multiple RU (MRU), the 80 MHz subblock may use 996-RU of FIG. 10.

Here, the MRU corresponds to a group of subcarriers (or tones) composed of a plurality of RUs, and the plurality of RUs constituting the MRU may be RUs having the same size or RUs having different sizes. For example, a single MRU may be defined as 52+26-tone, 106+26-tone, 484+242-tone, 996+484-tone, 996+484+242-tone, 2×996+484-tone, 3×996-tone, or 3×996+484-tone. Here, the plurality of RUs constituting one MRU may correspond to small size (e.g., 26, 52, or 106) RUs or large size (e.g., 242, 484, or 996) RUs. That is, one MRU including a small size RU and a large size RU may not be configured/defined. In addition, a plurality of RUs constituting one MRU may or may not be consecutive in the frequency domain.

When an 80 MHz subblock includes RUs smaller than 996 tones, or parts of the 80 MHz subblock are punctured, the 80 MHz subblock may use RU allocation other than the 996-tone RU.

The RU of the present disclosure may be used for uplink (UL) and/or downlink (DL) communication. For example, when trigger-based UL-MU communication is performed, the STA transmitting the trigger (e.g., AP) may allocate a first RU (e.g., 26/52/106/242-RU, etc.) to a first STA and allocate a second RU (e.g., 26/52/106/242-RU, etc.) to a second STA, through trigger information (e.g., trigger frame or triggered response scheduling (TRS)). Thereafter, the first STA may transmit a first trigger-based (TB) PPDU based on the first RU, and the second STA may transmit a second TB PPDU based on the second RU. The first/second TB PPDUs may be transmitted to the AP in the same time period.

For example, when a DL MU PPDU is configured, the STA transmitting the DL MU PPDU (e.g., AP) may allocate a first RU (e.g., 26/52/106/242-RU, etc.) to a first STA and allocate a second RU (e.g., 26/52/106/242-RU, etc.) to a second STA. That is, the transmitting STA (e.g., AP) may transmit the HE-STF, HE-LTF, and Data fields for the first STA through the first RU within one MU PPDU, and may transmit the HE-STF, HE-LTF, and Data fields for the second STA through the second RU.

Information on the allocation of RUs may be signaled through HE-SIG-B in the HE PPDU format.

FIG. 11 illustrates an example structure of a HE-SIG-B field.

As shown, the HE-SIG-B field may include a common field and a user-specific field. If HE-SIG-B compression is applied (e.g., full-bandwidth MU-MIMO transmission), the common field may not be included in HE-SIG-B, and the HE-SIG-B content channel may include only a user-specific field. If HE-SIG-B compression is not applied, the common field may be included in HE-SIG-B.

The common field may include information on RU allocation (e.g., RU assignment, RUs allocated for MU-MIMO, the number of MU-MIMO users (STAs), etc.)

The common field may include N*8 RU allocation subfields. Here, N is the number of subfields, N=1 in the case of 20 or 40 MHZ MU PPDU, N=2 in the case of 80 MHZ MU PPDU, N=4 in the case of 160 MHz or 80+80 MHZ MU PPDU, etc. One 8-bit RU allocation subfield may indicate the size (26, 52, 106, etc.) and frequency location (or RU index) of RUs included in the 20 MHz band.

For example, if a value of the 8-bit RU allocation subfield is 00000000, it may indicate that nine 26-RUs are sequentially allocated in order from the leftmost to the rightmost in the example of FIG. 8, if the value is 00000001, it may indicate that seven 26-RUs and one 52-RU are sequentially allocated in order from leftmost to rightest, and if the value is 00000010, it may indicate that five 26-RUs, one 52-RU, and two 26-RUs are sequentially allocated from the leftmost side to the rightmost side.

As an additional example, if the value of the 8-bit RU allocation subfield is 01000y2y1y0, it may indicate that one 106-RU and five 26-RUs are sequentially allocated from the leftmost to the rightmost in the example of FIG. 8. In this case, multiple users/STAs may be allocated to the 106-RU in the MU-MIMO scheme. Specifically, up to 8 users/STAs may be allocated to the 106-RU, and the number of users/STAs allocated to the 106-RU is determined based on 3-bit information (i.e., y2y1y0). For example, when the 3-bit information (y2y1y0) corresponds to a decimal value N, the number of users/STAs allocated to the 106-RU may be N+1.

Basically, one user/STA may be allocated to each of a plurality of RUs, and different users/STAs may be allocated to different RUs. For RUs larger than a predetermined size (e.g., 106, 242, 484, 996-tones, . . . ), a plurality of users/STAs may be allocated to one RU, and MU-MIMO scheme may be applied for the plurality of users/STAs.

The set of user-specific fields includes information on how all users (STAs) of the corresponding PPDU decode their payloads. User-specific fields may contain zero or more user block fields. The non-final user block field includes two user fields (i.e., information to be used for decoding in two STAs). The final user block field contains one or two user fields. The number of user fields may be indicated by the RU allocation subfield of HE-SIG-B, the number of symbols of HE-SIG-B, or the MU-MIMO user field of HE-SIG-A. A User-specific field may be encoded separately from or independently of a common field.

Figure 12:
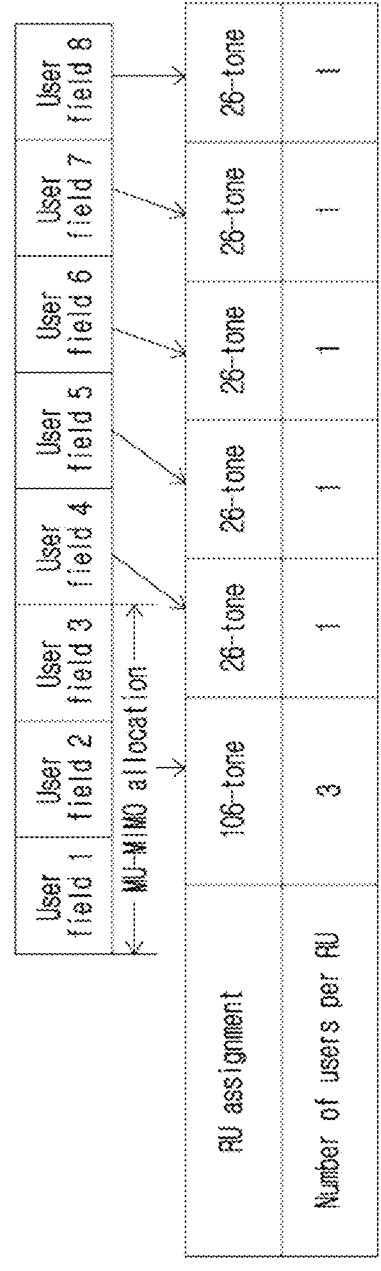
FIG. 12 is a diagram for describing the MU-MIMO scheme in which multiple users/STAs are allocated to one RU.

FIG. 12 is a diagram for explaining a MU-MIMO method in which a plurality of users/STAs are allocated to one RU.

In the example of FIG. 12, it is assumed that the value of the RU allocation subfield is 01000010. This corresponds to the case where y2y1y0=010 in 01000y2y1y0. 010 corresponds to 2 in decimal (i.e., N=2) and may indicate that 3 (=N+1) users are allocated to one RU. In this case, one 106-RU and five 26-RUs may be sequentially allocated from the leftmost side to the rightmost side of a specific 20 MHZ band/channel. Three users/STAs may be allocated to the 106-RU in a MU-MIMO manner. As a result, a total of 8 users/STAs are allocated to the 20 MHz band/channel, and the user-specific field of HE-SIG-B may include 8 user fields (i.e., 4 user block fields). Eight user fields may be assigned to RUs as shown in FIG. 12.

The user field may be constructed based on two formats. The user field for a MU-MIMO allocation may be constructed with a first format, and the user field for non-MU-MIMO allocation may be constructed with a second format. Referring to the example of FIG. 12, user fields 1 to 3 may be based on the first format, and user fields 4 to 8 may be based on the second format. The first format and the second format may contain bit information of the same length (e.g., 21 bits).

The user field of the first format (i.e., format for MU-MIMO allocation) may be constructed as follows. For example, out of all 21 bits of one user field, B0-B10 includes the user's identification information (e.g., STA-ID, AID, partial AID, etc.), B11-14 includes spatial configuration information such as the number of spatial streams for the corresponding user, B15-B18 includes Modulation and Coding Scheme (MCS) information applied to the Data field of the corresponding PPDU, B19 is defined as a reserved field, and B20 may include information on a coding type (e.g., binary convolutional coding (BCC) or low-density parity check (LDPC)) applied to the Data field of the corresponding PPDU.

The user field of the second format (i.e., the format for non-MU-MIMO allocation) may be constructed as follows. For example, out of all 21 bits of one user field, B0-B10 includes the user's identification information (e.g., STA-ID, AID, partial AID, etc.), B11-13 includes information on the number of spatial streams (NSTS) applied to the corresponding RU, B14 includes information indicating whether beamforming is performed (or whether a beamforming steering matrix is applied), B15-B18 includes Modulation and Coding Scheme (MCS) information applied to the Data field of the corresponding PPDU, B19 includes information indicating whether DCM (dual carrier modulation) is applied, and B20 may include information on a coding type (e.g., BCC or LDPC) applied to the Data field of the corresponding PPDU.

MCS, MCS information, MCS index, MCS field, and the like used in the present disclosure may be indicated by a specific index value. For example, MCS information may be indicated as index 0 to index 11. MCS information includes information on constellation modulation type (e.g., BPSK, QPSK, 16-QAM, 64-QAM, 256-QAM, 1024-QAM, etc.), and coding rate (e.g., ½, ⅔, ¾, ⅚, etc.). Information on a channel coding type (e.g., BCC or LDPC) may be excluded from the MCS information.

Figure 13:
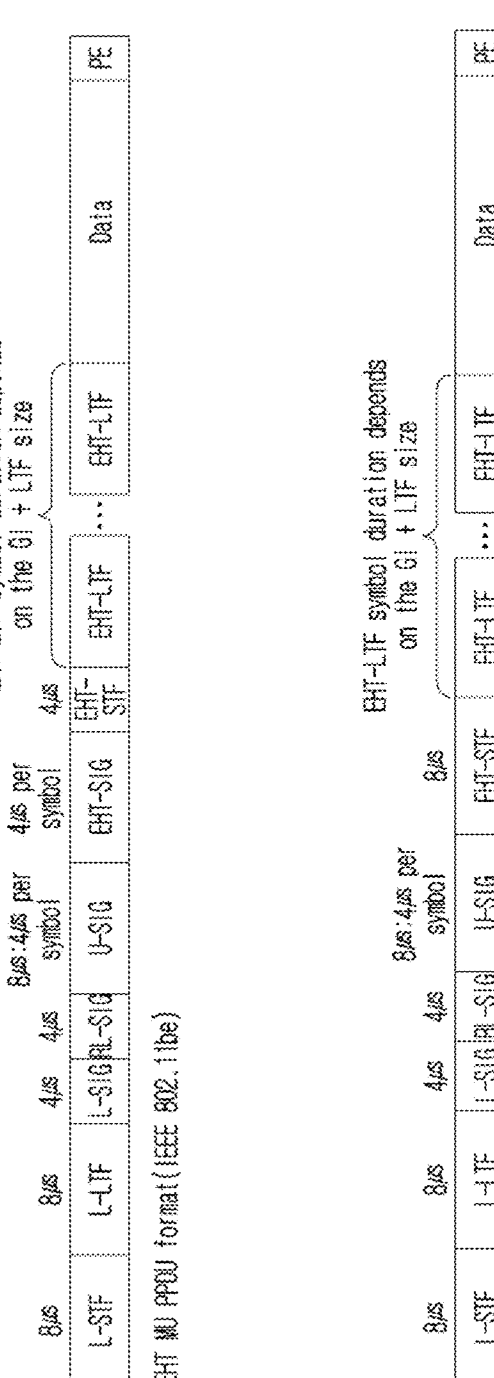
FIG. 13 shows an example of a PPDU format to which this disclosure may be applied.

FIG. 13 illustrates an example of a PPDU format to which the present disclosure may be applied.

The PPDU of FIG. 13 may be referred as various names such as an EHT PPDU, a transmitted PPDU, a received PPDU, a first type or an Nth type PPDU. For example, the PPDU or EHT PPDU of the present disclosure may be referred as various names such as a transmission PPDU, a reception PPDU, a first type or an Nth type PPDU. In addition, the EHT PPU may be used in an EHT system and/or a new wireless LAN system in which the EHT system is improved.

The EHT MU PPDU of FIG. 13 corresponds to a PPDU carrying one or more data (or PSDUs) for one or more users. That is, the EHT MU PPDU may be used for both SU transmission and MU transmission. For example, the EHT MU PPDU may correspond to a PPDU for one receiving STA or a plurality of receiving STAs.

In the EHT TB PPDU of FIG. 13, the EHT-SIG is omitted compared to the EHT MU PPDU. Upon receiving a trigger for UL MU transmission (e.g., a trigger frame or TRS), the STA may perform UL transmission based on the EHT TB PPDU format.

In the example of the EHT PPDU format of FIG. 13, L-STF to EHT-LTF correspond to a preamble or a physical preamble, and may be generated/transmitted/received/acquired/decoded in the physical layer.

A Subcarrier frequency spacing of L-STF, L-LTF, L-SIG, RL-SIG, Universal SIGNAL (U-SIG), EHT-SIG field (these are referred to as pre-EHT modulated fields) may be set to 312.5 kHz. A subcarrier frequency spacing of the EHT-STF, EHT-LTF, Data, and PE field (these are referred to as EHT modulated fields) may be set to 78.125 KHZ. That is, the tone/subcarrier index of L-STF, L-LTF, L-SIG, RL-SIG, U-SIG, and EHT-SIG field may be indicated in units of 312.5 kHz, and the tone/subcarrier index of EHT-STF, EHT-LTF, Data, and PE field may be indicated in units of 78.125 KHZ.

The L-LTF and L-STF of FIG. 13 may be constructed identically to the corresponding fields of the PPDU described in FIGS. 6 to 7.

The L-SIG field of FIG. 13 may be constructed with 24 bits and may be used to communicate rate and length information. For example, the L-SIG field includes a 4-bit Rate field, a 1-bit Reserved bit, a 12-bit Length field, a 1-bit Parity field, and a 6-bit Tail field may be included. For example, the 12-bit Length field may include information on a time duration or a length of the PPDU. For example, a value of the 12-bit Length field may be determined based on the type of PPDU. For example, for a non-HT, HT, VHT, or EHT PPDU, the value of the Length field may be determined as a multiple of 3. For example, for the HE PPDU, the value of the Length field may be determined as a multiple of 3+1 or a multiple of 3+2.

For example, the transmitting STA may apply BCC encoding based on a coding rate of ½ to 24-bit information of the L-SIG field. Thereafter, the transmitting STA may obtain 48-bit BCC coded bits. BPSK modulation may be applied to 48-bit coded bits to generate 48 BPSK symbols. The transmitting STA may map 48 BPSK symbols to any location except for a pilot subcarrier (e.g., {subcarrier index −21, −7, +7, +21}) and a DC subcarrier (e.g., {subcarrier index 0}). As a result, 48 BPSK symbols may be mapped to subcarrier indices −26 to −22, −20 to −8, −6 to −1, +1 to +6, +8 to +20, and +22 to +26. The transmitting STA may additionally map the signals of {−1, −1, −1, 1} to the subcarrier index {−28, −27, +27, +28}. The above signal may be used for channel estimation in the frequency domain corresponding to {−28, −27, +27, +28}.

The transmitting STA may construct RL-SIG which is constructed identically to L-SIG. For RL-SIG. BPSK modulation is applied. The receiving STA may recognize that the received PPDU is a HE PPDU or an EHT PPDU based on the existence of the RL-SIG.

After the RL-SIG of FIG. 13, a Universal SIG (U-SIG) may be inserted. The U-SIG may be referred as various names such as a first SIG field, a first SIG, a first type SIG, a control signal, a control signal field, and a first (type) control signal, etc.

The U-SIG may include N-bit information and may include information for identifying the type of EHT PPDU. For example, U-SIG may be configured based on two symbols (e.g., two consecutive OFDM symbols). Each symbol (e.g., OFDM symbol) for the U-SIG may have a duration of 4 us, and the U-SIG may have a total 8 us duration. Each symbol of the U-SIG may be used to transmit 26 bit information. For example, each symbol of the U-SIG may be transmitted and received based on 52 data tones and 4 pilot tones.

Through the U-SIG (or U-SIG field), for example, A bit information (e.g., 52 un-coded bits) may be transmitted, the first symbol of the U-SIG (e.g., U-SIG-1) may transmit the first X bit information (e.g., 26 un-coded bits) of the total A bit information, and the second symbol of the U-SIG (e.g., U-SIG-2) may transmit the remaining Y-bit information (e.g., 26 un-coded bits) of the total A-bit information. For example, the transmitting STA may obtain 26 un-coded bits included in each U-SIG symbol. The transmitting STA may generate 52-coded bits by performing convolutional encoding (e.g., BCC encoding) based on a rate of R=½, and perform interleaving on the 52-coded bits. The transmitting STA may generate 52 BPSK symbols allocated to each U-SIG symbol by performing BPSK modulation on the interleaved 52-coded bits. One U-SIG symbol may be transmitted based on 56 tones (subcarriers) from subcarrier index −28 to subcarrier index +28, except for DC index 0. The 52 BPSK symbols generated by the transmitting STA may be transmitted based on the remaining tones (subcarriers) excluding pilot tones −21, −7, +7, and +21 tones.

For example, the A bit information (e.g., 52 un-coded bits) transmitted by the U-SIG includes a CRC field (e.g., a 4-bit field) and a tail field (e.g., 6 bit-length field). The CRC field and the tail field may be transmitted through the second symbol of the U-SIG. The CRC field may be constructed based on 26 bits allocated to the first symbol of U-SIG and 16 bits remaining except for the CRC/tail field in the second symbol, and may be constructed based on a conventional CRC calculation algorithm. In addition, the tail field may be used to terminate the trellis of the convolution decoder, and for example, the tail field may be set to 0.

A bit information (e.g., 52 un-coded bits) transmitted by the U-SIG (or U-SIG field) may be divided into version-independent bits and version-independent bits. For example, a size of the version-independent bits may be fixed or variable. For example, the version-independent bits may be allocated only to the first symbol of U-SIG, or the version-independent bits may be allocated to both the first symbol and the second symbol of U-SIG. For example, the version-independent bits and the version-dependent bits may be referred as various names such as a first control bit and a second control bit, etc.

For example, the version-independent bits of the U-SIG may include a 3-bit physical layer version identifier (PHY version identifier). For example, the 3-bit PHY version identifier may include information related to the PHY version of the transmitted/received PPDU. For example, the first value of the 3-bit PHY version identifier may indicate that the transmission/reception PPDU is an EHT PPDU. In other words, when transmitting the EHT PPDU, the transmitting STA may set the 3-bit PHY version identifier to a first value. In other words, the receiving STA may determine that the received PPDU is an EHT PPDU based on the PHY version identifier having the first value.

For example, the version-independent bits of U-SIG may include a 1-bit UL/DL flag field. A first value of the 1-bit UL/DL flag field is related to UL communication, and a second value of the UL/DL flag field is related to DL communication.

For example, the version-independent bits of the U-SIG may include information on the length of a transmission opportunity (TXOP) and information on a BSS color ID.

For example, if the EHT PPDU is classified into various types (e.g., EHT PPDU related to SU mode, EHT PPDU related to MU mode, EHT PPDU related to TB mode, EHT PPDU related to Extended Range transmission, etc.), information on the type of EHT PPDU may be included in the version-dependent bits of the U-SIG.

For example, the U-SIG may include information on 1) a bandwidth field containing information on a bandwidth, 2) a field containing information on a MCS scheme applied to EHT-SIG, 3) an indication field containing information related to whether the DCM technique is applied to the EHT-SIG, 4) a field containing information on the number of symbols used for EHT-SIG, 5) a field containing information on whether EHT-SIG is constructed over all bands, 6) a field containing information on the type of EHT-LTF/STF, and 7) a field indicating the length of EHT-LTF and CP length.

Preamble puncturing may be applied to the PPDU of FIG. 13. Preamble puncturing may mean transmission of a PPDU for which no signal is present in one or more 20 MHZ subchannels among the bandwidth of the PPDU. Preamble puncturing may be applied to a PPDU transmitted to one or more users.

For example, the resolution of preamble puncturing may be 20 MHZ for EHT MU PPDUs in OFDMA transmissions with bandwidths greater than 40 MHz and non-OFDMA transmissions with 80 MHz and 160 MHZ bandwidths. That is, in the above case, puncturing on a subchannel smaller than 242-tone RU may not be allowed. In addition, for an EHT MU PPDU in non-OFDMA transmission with a bandwidth of 320 MHz, the resolution of preamble puncturing may be 40 MHZ. That is, puncturing for a subchannel smaller than 484-tone RU in a 320 MHz bandwidth may not be allowed. In addition, preamble puncturing may not be applied to the primary 20 MHz channel in the EHT MU PPDU.

Information about preamble puncturing applied to the PPDU may be included in U-SIG and/or EHT-SIG. For example, the first field of U-SIG may include information about the contiguous bandwidth of the PPDU, and the second field of U-SIG may include information about preamble puncturing applied to the PPDU.

For example, the U-SIG and the EHT-SIG may include information on preamble puncturing based on the following method. If the bandwidth of the PPDU exceeds 80 MHZ, the U-SIG may be individually constructed in units of 80 MHZ. For example, if the bandwidth of the PPDU is 160 MHZ, the PPDU may include a first U-SIG for a first 80 MHz band and a second U-SIG for a second 80 MHz band. In this case, the first field of the first U-SIG includes information on the 160 MHZ bandwidth, and the second field of the first U-SIG includes information on preamble puncturing applied to the first 80 MHZ band (i.e., information on a preamble puncturing pattern). In addition, the first field of the second U-SIG includes information on a 160 MHz bandwidth, and the second field of the second U-SIG includes information on preamble puncturing applied to a second 80 MHZ band (i.e., information on a preamble puncturing pattern). The EHT-SIG following the first U-SIG may include information on preamble puncturing applied to the second 80 MHz band (i.e., information on a preamble puncturing pattern), and the EHT-SIG following the second U-SIG may include information on preamble puncturing applied to the first 80 MHz band (i.e., information on a preamble puncturing pattern).

Additionally or alternatively, the U-SIG and the EHT-SIG may include information on preamble puncturing based on the following method. The U-SIG may include information on preamble puncturing for all bands (i.e., information on a preamble puncturing pattern). That is, EHT-SIG does not include information on preamble puncturing, and only U-SIG may include information on preamble puncturing (i.e., information on a preamble puncturing pattern).

U-SIG may be constructed in units of 20 MHZ. For example, if an 80 MHZ PPDU is constructed, the U-SIG may be duplicated. That is, the same 4 U-SIGs may be included in the 80 MHz PPDU. PPDUs exceeding 80 MHz bandwidth may include different U-SIGs.

The EHT-SIG of FIG. 13 may include control information for the receiving STA. EHT-SIG may be transmitted through at least one symbol, and one symbol may have a length of 4 us. Information on the number of symbols used for EHT-SIG may be included in U-SIG.

The EHT-SIG may include technical features of HE-SIG-B described through FIGS. 11 and 12. For example, EHT-SIG, like the example of FIG. 8, may include a common field and a user-specific field. The Common field of the EHT-SIG may be omitted, and the number of user-specific fields may be determined based on the number of users.

As in the example of FIG. 11, the common field of the EHT-SIG and the user-specific field of the EHT-SIG may be coded separately. One user block field included in the user-specific field may contain information for two user fields, but the last user block field included in the user-specific field may contain one or two user fields. That is, one user block field of the EHT-SIG may contain up to two user fields. As in the example of FIG. 12, each user field may be related to MU-MIMO allocation or non-MU-MIMO allocation.

In the same way as in the example of FIG. 11, the common field of the EHT-SIG may include a CRC bit and a Tail bit, The length of the CRC bit may be determined as 4 bits, and the length of the tail bit is determined by 6 bits and may be set to 000000.

Same as the example of FIG. 11, the common field of EHT-SIG may include RU allocation information. RU allocation information may mean information about the location of a RU to which multiple users (i.e., multiple receiving STAs) are allocated. RU allocation information may be configured in units of 8 bits (or N bits).

A mode in which a common field of EHT-SIG is omitted may be supported. The mode in which the common field of the EHT-SIG is omitted may be referred as a compressed mode. When the compressed mode is used, a plurality of users (i.e., a plurality of receiving STAs) of the EHT PPDU may decode the PPDU (e.g., the data field of the PPDU) based on non-OFDMA. That is, a plurality of users of the EHT PPDU may decode a PPDU (e.g., a data field of the PPDU) received through the same frequency band. When a non-compressed mode is used, multiple users of the EHT PPDU may decode the PPDU (e.g., the data field of the PPDU) based on OFDMA. That is, a plurality of users of the EHT PPDU may receive the PPDU (e.g., the data field of the PPDU) through different frequency bands.

EHT-SIG may be constructed based on various MCS scheme. As described above, information related to the MCS scheme applied to the EHT-SIG may be included in the U-SIG. The EHT-SIG may be constructed based on the DCM scheme. The DCM scheme may reuse the same signal on two subcarriers to provide an effect similar to frequency diversity, reduce interference, and improve coverage. For example, modulation symbols to which the same modulation scheme is applied may be repeatedly mapped on available tones/subcarriers. For example, modulation symbols (e.g., BPSK modulation symbols) to which a specific modulation scheme is applied may be mapped to first contiguous half tones (e.g., 1st to 26th tones) among the N data tones (e.g., 52 data tones) allocated for EHT-SIG, and modulation symbols (e.g., BPSK modulation symbols) to which the same specific modulation scheme is applied may be mapped to the remaining contiguous half tones (e.g., 27th to 52nd tones). That is, a modulation symbol mapped to the 1st tone and a modulation symbol mapped to the 27th tone are the same. As described above, information related to whether the DCM scheme is applied to the EHT-SIG (e.g., a 1-bit field) may be included in the U-SIG. The EHT-STF of FIG. 13 may be used to enhance automatic gain control (AGC) estimation in a MIMO environment or an OFDMA environment. The EHT-LTF of FIG. 13 may be used to estimate a channel in a MIMO environment or an OFDMA environment.

Information on the type of STF and/or LTF (including information on a guard interval (GI) applied to LTF) may be included in the U-SIG field and/or the EHT-SIG field of FIG. 13.

The PPDU (i.e., EHT PPDU) of FIG. 13 may be constructed based on an example of RU allocation of FIGS. 8 to 10.

For example, a EHT PPDU transmitted on a 20 MHz band, that is, a 20 MHZ EHT PPDU may be constructed based on the RU of FIG. 8. That is, a RU location of EHT-STF, EHT-LTF, and data field included in the EHT PPDU may be determined as shown in FIG. 8. A EHT PPDU transmitted on a 40 MHz band, that is, a 40 MHZ EHT PPDU may be constructed based on the RU of FIG. 9. That is, a RU location of EHT-STF, EHT-LTF, and data field included in the EHT PPDU may be determined as shown in FIG. 9.

The EHT PPDU transmitted on the 80 MHz band, that is, the 80 MHZ EHT PPDU may be constructed based on the RU of FIG. 10. That is, a RU location of EHT-STF, EHT-LTF, and data field included in the EHT PPDU may be determined as shown in FIG. 10. The tone-plan for 80 MHz in FIG. 10 may correspond to two repetitions of the tone-plan for 40 MHz in FIG. 9.

The tone-plan for 160/240/320 MHz may be configured in the form of repeating the pattern of FIG. 9 or 10 several times.

The PPDU of FIG. 13 may be identified as an EHT PPDU based on the following method.

The receiving STA may determine the type of the received PPDU as the EHT PPDU based on the following. For example, when 1) the first symbol after the L-LTF signal of the received PPDU is BPSK, 2) RL-SIG in which the L-SIG of the received PPDU is repeated is detected, and 3) the result of applying the modulo 3 calculation to the value of the Length field of the L-SIG of the received PPDU (i.e., the remainder after dividing by 3) is detected as 0, the received PPDU may be determined as a EHT PPDU. When the received PPDU is determined to be an EHT PPDU, the receiving STA may determine the type of the EHT PPDU based on bit information included in symbols subsequent to the RL-SIG of FIG. 13. In other words, the receiving STA may determine the received PPDU as a EHT PPDU, based on 1) the first symbol after the L-LTF signal, which is BSPK, 2) RL-SIG contiguous to the L-SIG field and identical to the L-SIG, and 3) L-SIG including a Length field in which the result of applying modulo 3 is set to 0.

For example, the receiving STA may determine the type of the received PPDU as the HE PPDU based on the following. For example, when 1) the first symbol after the L-LTF signal is BPSK, 2) RL-SIG in which L-SIG is repeated is detected, and 3) the result of applying modulo 3 to the length value of L-SIG is detected as 1 or 2, the received PPDU may be determined as a HE PPDU.

For example, the receiving STA may determine the type of the received PPDU as non-HT, HT, and VHT PPDU based on the following. For example, when 1) the first symbol after the L-LTF signal is BPSK and 2) RL-SIG in which L-SIG is repeated is not detected, the received PPDU may be determined as non-HT, HT, and VHT PPDU.

The PPDU of FIG. 13 can be used to transmit and receive various types of frames. For example, the PPDU of FIG. 13 may be used for (simultaneous) transmission and reception of one or more of a control frame, management frame, or data frame.

Hereinafter, trigger-based transmission is described.

Figure 14:
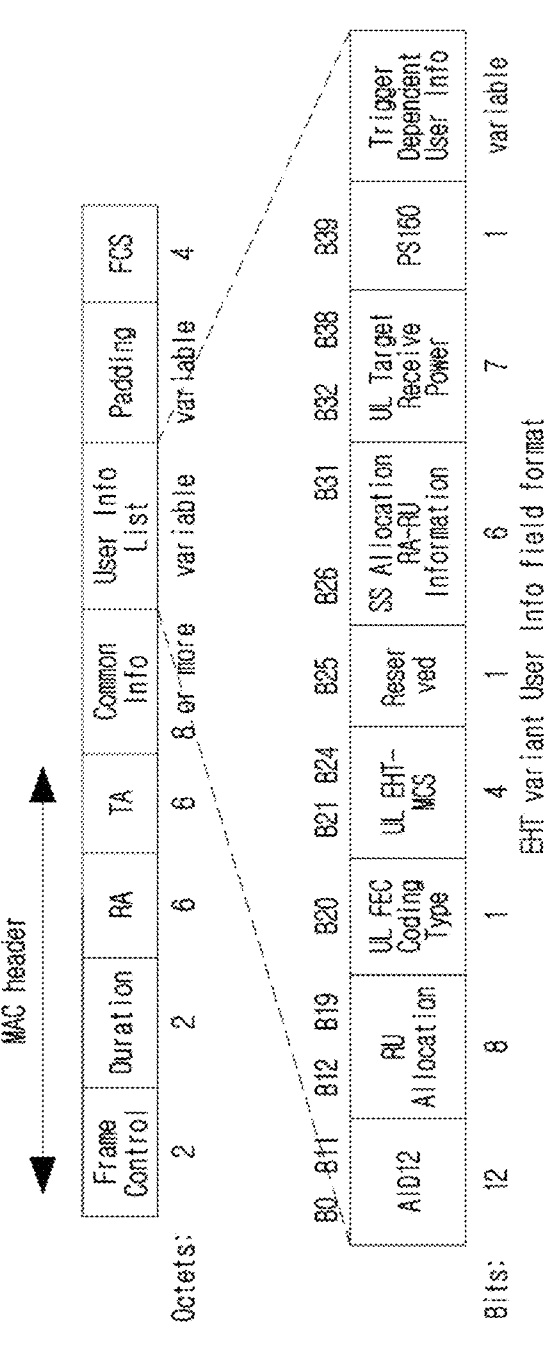
FIG. 14 is a diagram illustrating an example format of a trigger frame to which the present disclosure may be applied.

FIG. 14 is a diagram illustrating an example format of a trigger frame to which the present disclosure may be applied.

The trigger frame may allocate resources for transmission of one or more TB PPDUs and request transmission of TB PPDUs. The trigger frame may also include other information required by the STA, which transmits the TB PPDU in response. The trigger frame may include common information and user info list fields in the frame body.

The common information field may include information commonly applied to the transmission of one or more TB PPDUs requested by a trigger frame, for example, trigger type, UL length, presence of a subsequent trigger frame (e.g. More TF), whether CS(channel sensing) is required, UL BW(bandwidth), etc.

The user information list includes zero or more user information fields. FIG. 14 shows an EHT variant user information field format as an example.

The AID12 subfield basically indicates that it is a user information field for the STA with the corresponding AID. In addition, if the AID12 field has a specific predetermined value, it may be used for other purposes, such as allocating a random access (RA)-RU or being configured as a special user information field. A special user information field is a user information field that does not contain user-specific information but includes extended common information not provided in the common information field. For example, the special user information field may be identified by an AID12 value of 2007, and the special user information field flag subfield within the common information field may indicate whether the special user information field is included.

The RU allocation subfield may indicate the size and location of the RU/MRU. To this end, the RU allocation subfield may be interpreted together with the PS160 (primary/secondary 160 MHz) subfield of the user information field and the UL BW subfield of the common information field.

Hereinafter, TID-to-Link mapping during link management (LM) will be described. Here. TID refers to an identifier that can be used by a higher layer entity to distinguish between a MAC entity that supports Quality of Service (QOS) and a MAC service data unit (MSDU) within a MAC data service.

For example, there may be 16 possible TID values. Of the 16 TID values, 8 may identify a traffic category (TC), and the remaining 8 may identify a parameterized traffic stream (TS). TID may be assigned to the MSDU of the MAC higher layer.

The TID-to-Link mapping mechanism refers to a mechanism that allows AP MLDs(multi-link devices) and non-AP MLDs that perform multi-link setup to determine how setup links and TIDs are mapped in DL and UL.

Here, MLD is a logical entity and refers to a device that has one or more affiliated STAs, one MAC data service, and a single MAC service access point for logical link control (LLC). Non-AP MLD refers to an MLD in which each STA belonging to the MLD is a non-AP STA. Multi-radio non-AP MLD refers to a non-AP MLD that supports reception or exchange of frames on more than one link at a time. AP MLD refers to an MLD where each STA belonging to the MLD is an AP.

By default, all TIDs must be mapped to all setup links for DL and UL. If two MLDs explicitly negotiate TID-to-Link mapping, each TID may be mapped to the same or different link sets.

If at least one TID is mapped to the link, the setup link may be defined as enabled, and if there is no TID mapped to the link, the setup link may be defined as disabled. A TID must always be mapped to at least one setup link unless admission control is used. By default, the TID is mapped to all setup links, so all setup links may be enabled.

When a link is enabled, the link may be used for frame exchange depending on the power state of the non-AP STA operating on the link. Only MSDUs or A-MSDUs with a TID mapped to an enabled link may be transmitted on that link. Management frames and control frames may only be transmitted on enabled links.

When a link is disabled, that link may not be used for frame exchange, including management frames for both DL and UL.

In the multi-link setup process, enabling/disabling of each link may be indicated through TID-to-Link mapping. TID-to-Link mapping may be performed in default mapping mode or/and negotiation mapping mode.

The default mapping mode refers to a mode in which all TIDs are mapped to links by the AP. Specifically, in the default mapping mode, all TIDs are mapped to all setup links for DL and UL, and all setup links may be enabled. A non-AP MLD and an AP MLD that has performed multi-link configuration may operate in the default mapping mode if TID-to-Link mapping negotiation for another mapping does not occur, fails, or is torn down.

The negotiation mapping mode refers to a mode in which the AP approves or rejects when the STA transmits information about the links to be mapped to the TID to the AP through the TID-to-Link mapping element included in (re) association request frame or TID-to-Link mapping request frame.

Specifically, MLD may support TID-to-Link mapping negotiation. An MLD that supports TID-to-Link mapping negotiation has 'truedot11TIDtoLinkMappingActivated' as 'true', and the value of the TID-to-Link mapping negotiation supported subfield in the MLD Capability field of the basic variant multi-link element may be set to a value other than 0. Otherwise, the MLD may set the value of the TID-to-Link Mapping Negotiation Supported subfield to 0.

If the AP MLD indicates support for TID-to-Link mapping negotiation in the multi-link (re)setup procedure, a non-AP MLD may initiate TID-to-Link mapping negotiation by including a TID-to-Link mapping element on the (re) association request frame.

After receiving a (re)connection request frame containing a TID-to-Link mapping element, the AP MLD may respond to the (re)connection request frame according to the rules described later.

For example, if and only if at least one TID approves multi-link (re)setup for all links requested to be mapped, the AP MLD may approve the TID-to-Link mapping requested in the TID-to-Link mapping element in the received (re) association request frame. In this case, the AP MLD may not include the TID-to-Link mapping element in the (re)assembly response frame.

Otherwise, the AP MLD may indicate rejection of the proposed TID-to-Link mapping by including in the (re) association response frame a TID-to-Link mapping element proposing the preferred TID-to-Link mapping.

After multi-link (re)setup is successful, to negotiate a new TID-to-Link mapping, an initiating MLD with 'dot11TIDtoLinkMappingActivated' of 'true' may transmit an individually addressed TID-to-Link mapping request frame to a responding MLD that indicates support for TID-to-Link mapping negotiation.

After receiving the individually addressed TID-to-Link mapping request frame, the responding MLD may transmit an individually addressed TID-to-Link mapping response frame to the initiating MLD according to rules described below.

For example, if the responding MLD approves the TID-to-Link requested in the TID-to-Link mapping element of the received TID-to-Link mapping request frame, the responding MLD may set the status code to 0 (SUCCESS) in the TID-to-Link mapping response frame.

Otherwise, the responding MLD may indicate rejection for the proposed TID-to-Link mapping by setting the status code to 'DENIED_TID_TO_LINK MAPPING' or 'PREFERED_TID_TO_LINK_MAPPING_SUGGESTED' in the TID-to-Link mapping response frame. The responding MLD may suggest a preferred TID-to-Link mapping by setting the 'PREFERRED_TID_TO_LINK_MAPPING_SUGGESTED' status code in the TID-to-Link mapping response frame and including a TID-to-Link mapping element in the TID-to-Link mapping response frame.

When two MLDs have negotiated a TID-to-Link mapping, each MLD may teardown the negotiated TID-to-Link mapping by sending an individually addressed TID-to-Link mapping teardown frame. After disassembly, MLD may operate in default mapping mode.

When an MLD successfully negotiates with a peer MLD and/or for uplink and/or downlink TID-to-Link mapping, where bit position i of the link mapping field of the TID of the TID-to-Link mapping element is set to 0, TID n may not be mapped to the link associated with link ID i in the uplink and/or downlink.

When an MLD successfully negotiates with a peer MLD and/or for uplink and/or downlink TID-to-Link mapping where bit position i of the link mapping field of the TID of the TID-to-Link mapping element is set to 1, TID n may be mapped to the link associated with link ID i in uplink and/or downlink.

Figure 15:
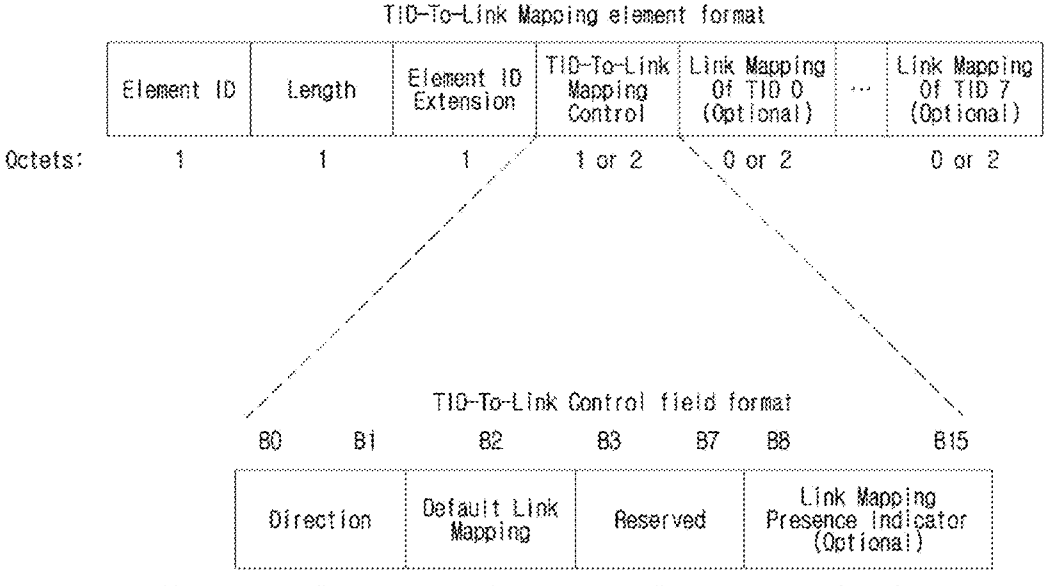
FIG. 15 is a diagram illustrating an example format of TID to link mapping elements to which this disclosure may be applied.

FIG. 15 illustrates a TID-to-Link mapping element format and a TID-to-Link control field format that may be applied to this disclosure.

The TID-to-Link mapping element represents the link on which frames belonging to each TID may be exchanged. As shown in FIG. 15, the TID-to-Link mapping element may include an element ID subfield, a length subfield, an element ID extension subfield, a TID-to-Link mapping control subfield, and a link mapping of TID n (n is an integer greater than or equal to 0) subfield.

In addition, the TID-to-Link mapping control subfield may include a direction subfield, a default link mapping subfield, a reserved subfield, and a link mapping presence indicator subfield.

If the TID-to-Link mapping element provides TID-to-Link mapping information for frames transmitted in the downlink, the direction subfield value may be set to 0 (uplink). If the TID-to-Link mapping element provides TID-to-Link mapping information for frames transmitted in the uplink, the direction subfield value may be set to 1 (downlink). If the TID-to-Link mapping element provides TID-to-Link mapping information for frames transmitted in both downlink and uplink, the direction subfield value may be set to 2 (bidirectional link). In the case of 3 among the direction subfield values, it may be reserved.

And, if the TID-to-Link mapping element indicates default TID-to-Link mapping, the default link mapping subfield value may be set to 1. Otherwise, the default link mapping subfield value may be set to 0.

The link mapping presence indicator subfield may indicate whether a link mapping field of TID n exists on the TID-to-Link mapping element. A value of 1 at bit position n of the link mapping presence indicator subfield may indicate that the link mapping field of TID n exists on the TID-to-Link mapping element. A value of 0 at bit position n of the link mapping presence indicator subfield may indicate that the link mapping field of TID n does not exist on the TID-to-Link mapping element. If the default link mapping subfield value is set to 1, the link mapping presence indicator subfield may be reserved.

The link mapping field of TID n may indicate a link that a frame belonging to TID n may transmit. A value of 1 in bit position i of the link mapping field of TID n may indicate that TID n is mapped to the link associated with link ID i for the direction specified in the direction subfield. If the default link mapping subfield value is set to 1, the link mapping field of TID n may not exist.

Hereinafter, the operation of changing TID information mapped to a specific link after the multi-link setup process will be described.

Figure 16:
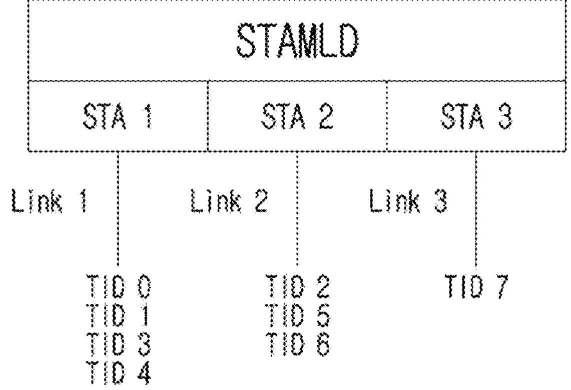
FIG. 16 is a diagram illustrating a process in which link mapping is performed on a plurality of TIDs to which the present disclosure may be applied.

As shown in FIG. 16, it is assumed that TID 0, TID 1, TID 3, and TID 4 are mapped to link 1, TID 2, TID 5, and TID 6 are mapped to link 2, and TID 7 is mapped to link 3. That is, assume a situation where multiple TIDs are mapped to Link 1 and Link 2, but only TID 7 is mapped to Link 3. Here, when it is desired to change link 3 to a disabled state, data corresponding to the TID mapped to link 3 cannot be processed.

To put link 3 in a disabled state, after disconnecting the mapping with all TIDS corresponding to Link 1, Link 2, and Link 3 through a teardown operation, the STA MLD may operate in the default mapping mode to perform a TID-to-Link mapping operation. Specifically, the STA MLD may request teardown of mapping with all TIDs previously corresponding to Link 1, Link 2, and Link 3 by transmitting a TID-to-Link mapping teardown frame to the AP MLD. Accordingly, when the mapping between each link and TID is torn down, the STA MLD may operate in the default mapping mode and may perform a TID-to-Link mapping operation. However, this is only an example, and when mapping the TID corresponding to the disabled link 3 to another link, a teardown operation may not be preceded.

After the TID-to-Link mapping operation according to the default mapping operation is completed, the STA MLD may perform the TID-to-Link mapping operation according to the negotiation mapping mode.

The present disclosure, as in the above-described example, describes a method to resolve unnecessary operations/overhead that may occur in the process of transitioning from a TID-to-Link mapping operation based on the default mapping mode to a TID-to-Link mapping operation based on the negotiation mapping mode after the tear-down operation.

Additionally or alternatively, Link 3, which should be moved to the disabled state after the teardown operation, is re-enabled according to the TID-to-Link mapping operation based on the default mapping mode. After switching to the disabled state for Link 3, a TID-to-Link mapping operation based on negotiation mapping mode may be performed.

As in the above-described examples, the present disclosure describes a method for solving the problem that Link 3, which was in a disabled state before the tear-down operation, is re-enabled after the tear-down operation by performing TID-to-Link mapping based on default mode mapping.

Figure 17:
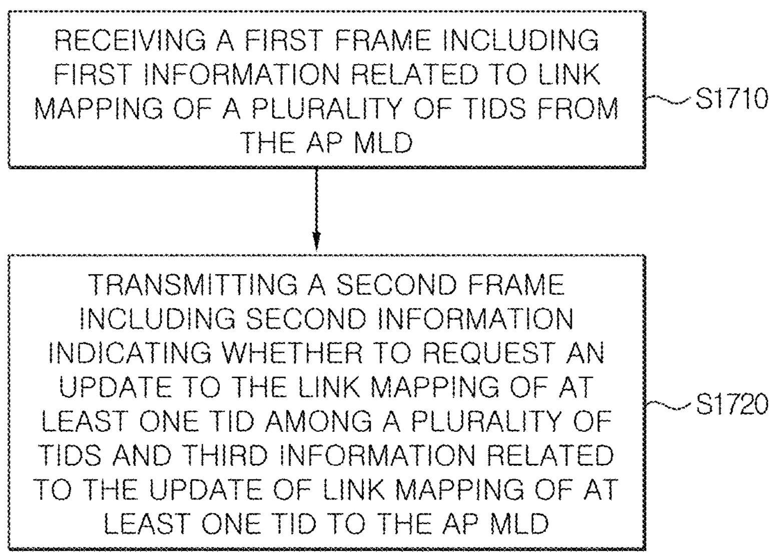
FIG. 17 is a diagram to describe how the STA MLD performs link management, according to an embodiment of the present disclosure.

FIG. 17 is a diagram for describing how the STA MLD performs link management, according to an embodiment of the present disclosure.

The STA MLD may receive a first frame including first information related to link mapping of a plurality of TIDs from the AP MLD (S1710).

The first information may be indicated by the link mapping field of the TID included in the TID-to-Link mapping element. For example, if TID 0 and TID 1 exist, the TID-to-Link mapping element may include a Link Mapping of TID 0 field and a Link Mapping of TID 1 field. And, the link mapping field of TID 0 and TID 1 may include information about the link to be mapped to TID 0 and TID 1.

Additionally, the first frame may include fourth information indicating that link mapping for a plurality of TIDs is performed in a default TID-to-link mapping mode. Here, the fourth information may be indicated by the default link mapping subfield of the TID-to-Link control field included in the TID-to-Link mapping element. For example, when the default link mapping subfield value is set to 1, the fourth information may indicate that link mapping for a plurality of TIDs is performed in the default TID-to-link mapping mode.

The STA MLD may transmit a second frame including second information indicating whether to request an update to the link mapping of at least one TID among a plurality of TIDs and third information related to the update of link mapping of at least one TID to the AP MLD (S1720).

Here, at least one TID among the plurality of TIDs may mean a TID for which the STA MLD will update link mapping information. For example, at least one TID may include a TID (i.e., TID m) with a specific index m (m is an integer greater than or equal to 0). At this time, TID m may mean the TID at which the STA MLD will update link mapping information.

The second frame includes a TID-to-Link mapping request frame, and the second information may be indicated by the TID-to-Link mapping control field of the TID-to-Link mapping element included in the TID-to-Link mapping request frame. For example, the second information may be indicated by a TID-to-Link mapping update subfield among the TID-to-Link mapping control fields, but this is not limited, and the name of the subfield may be changed in various ways. And, the second information may be set on at least one bit among the 4th bit (B3) to the 8th bit (B7) of the TID-to-Link mapping control field.

And, the third information may be indicated by the Link Mapping of TID m subfield included in the TID-to-Link mapping element. At this time, the link mapping information of TID m included in the third information may be different from the link mapping information of TID m included in the first information (that is, link mapping information set in the multi-link setup process). That is, since TID m is the TID for which STA MLD will update link mapping information, the link mapping information of TID m included in the third information may be different from the link mapping information of TID m included in the first information received from the AP MLD.

Additionally, the TID-to-Link mapping control field may include a link mapping presence indicator subfield that indicates whether a link mapping subfield of a specific TID exists on the TID-to-Link mapping element.

For example, if the link mapping subfield of TID 0 exists in the TID-to-Link mapping element, the first bit value of the link mapping presence indicator subfield may be set to 1. As another example, if the link mapping subfield of TID 0 does not exist in the TID-to-Link mapping element, the value of the first bit in the link mapping presence indicator subfield may be set to 0.

Based on the second information indicating requesting an update to the link mapping of at least one TID, the link mapping presence indicator subfield may indicate that only the link mapping subfield of at least one TID among a plurality of TIDs exists in the TID-to-Link mapping element. That is, the TID-to-Link mapping element may include only the link mapping subfield of the TID for which the STA MLD will update link mapping information. However, this is only an example, and the TID-to-Link mapping element may include link mapping subfields of all TIDs.

As another example, based on the second information indicating requesting an update to the link mapping of at least one TID, if the update of the link mapping of at least one TID is approved by the AP MLD, the link mapping of the at least one TID may be updated based on the third information.

Figure 18:
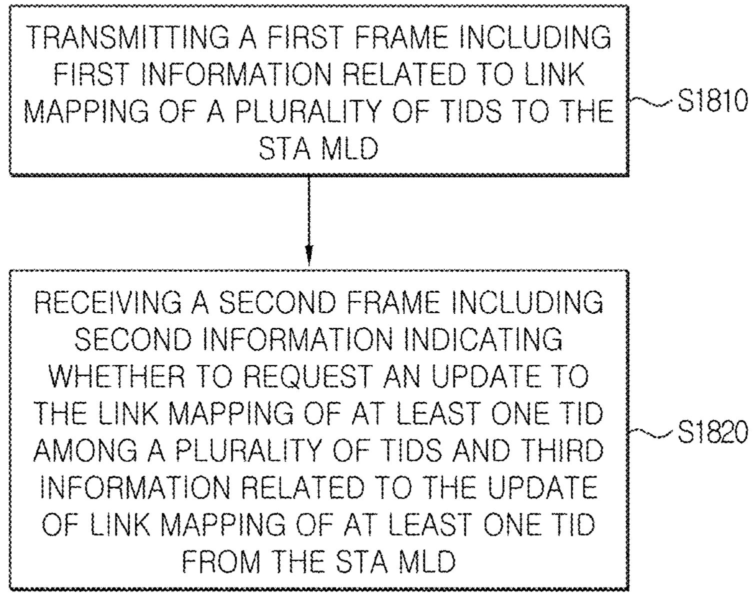
FIG. 18 is a diagram to describe how AP MLD performs link management, according to an embodiment of the present disclosure.

FIG. 18 is a diagram to describe how AP MLD performs link management, according to an embodiment of the present disclosure.

The AP MLD may transmit a first frame including first information related to link mapping of a plurality of TIDs to the STA MLD (S1810). Since features related to the first information and the first frame have been described with reference to S1710 of FIG. 17, redundant description will be omitted.

The AP MLD may receive a second frame including second information indicating whether to request an update to the link mapping of at least one TID among a plurality of TIDs and third information related to update of link mapping of at least one TID from the STA MLD (S1820).

The AP MLD may determine whether to approve or reject updating the link mapping information of TID n included in the first information with the link mapping information of TID n included in the third information. If it is determined to approve the update, the link mapping of at least one TID may be updated based on the third information.

Features related to the second frame have been described in detail with reference to S1720 of FIG. 17, so redundant description will be omitted.

Hereinafter, a method of changing (or updating/re-mapping) the information of the TID mapped to the link will be described after the multi-link setup process.

Here, the operation of changing information of the TID mapped to the link may include an operation to update the TID-to-Link mapping information of a link that is enabled, the operation of deleting the TID-to-Link mapping information of a link in an enabled state and converting it to a disabled state, and the operation of updating the TID-to-Link mapping information of a link that is in an disabled state and converting it to an enabled state.

Figure 19:
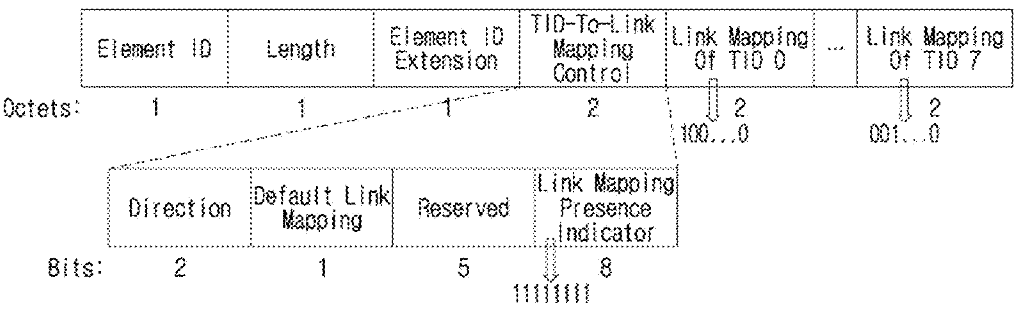
FIGS. 19 and 20 are diagrams for describing a process of updating link mapping of a plurality of TIDs to which the present disclosure may be applied.

FIG. 19 illustrates the format of the TID-to-Link mapping element included in the association request frame that the STA MLD transmits to the AP MLD to request TID-to-Link mapping based on negotiation mapping mode during the initial setup process.

Based on the value of the link mapping presence indicator subfield and the link mapping field of TID n, the TID-to-Link mapping element may include information requesting mapping of a specific link for each TID.

The embodiment described later will be described assuming that TID 0 to TID 7 are mapped to link 1 to link 3, as shown in FIG. 16. Although the link mapping fields of TID 1 to TID 6 are omitted in the TID-to-Link mapping element shown in FIG. 19, based on the link mapping field value of TID 0, it may be seen that TID 0 is mapped only to link 1, and based on the link mapping field value of TID 7, it may be seen that TID 7 is mapped only to link 3.

Embodiment 1

Embodiment 1 is an embodiment of a method for changing (or updating/re-mapping) information of a TID implicitly mapped to a link.

Specifically, the STA MLD may transmit a TID-to-Link mapping request frame, which is an action frame including a TID-to-Link mapping element including changed TID information, to the AP MLD. AP MLD may confirm changes by comparing the TID-to-Link mapping element of the received message (i.e., action frame) with the status of the TID mapped to the current links. If the STA MLD confirms and accepts the requested TID-to-Link mapping changes, AP MLD may update (update/re-mapping) TID-to-Link mapping information between STA MLDs for the above changes. At this time, if the STA MLD's request to update the TID-to-Link mapping is a request that violates basic requirements, the AP MLD may reject the request.

If the STA MLD requests a change in TID-to-Link mapping in the manner described above (i.e., implicitly), the TID-to-Link mapping element may be configured to include TID-to-Link mapping information to request change based on TID information mapped to current links.

Figure 20:
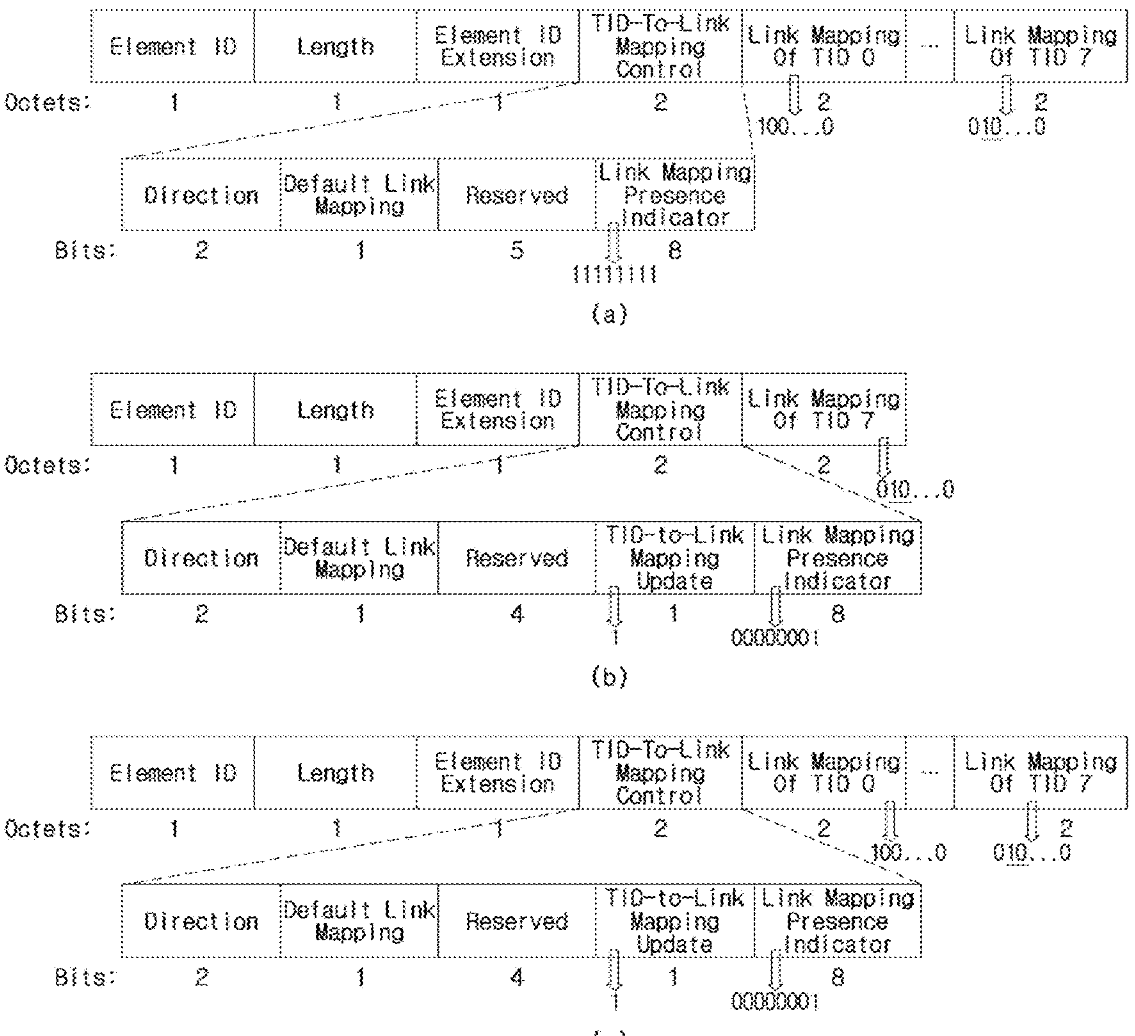

For example, assume that the STA MLD will change the link mapped for TID 7 from Link 3 to Link 2. FIG. 20 (*a*) illustrates the format of the TID-to-Link mapping element that the STA MLD transmits to the AP MLD to change the link mapped for TID 7 from link 3 to link 2. Among the Link Mapping of TID n fields included in the corresponding TID-to-Link mapping element, the value of the Link Mapping field of TID 7 indicates that it is mapping to Link 2, not Link 3.

At this time, the value of the link mapping presence indicator subfield indicates that it includes link mapping information for TID 0 to TID 7, as shown in FIG. 19, and the element may include link mapping fields of all TIDs from TID 0 to TID 7.

AP MLD may confirm changes in the value of the link mapping field of TID 7 by comparing/analyzing the current TID-to-Link mapping information (i.e., mapping information shown in FIG. 19) and the mapping information shown in (a) of FIG. 20. If the change request is approved, the AP MLD can change (i.e., update) the TID-to-Link mapping information of Link 3 and Link 2 of the STA MLD.

Embodiment 2

Embodiment 2 is an embodiment of a method of changing information of a TID explicitly mapped to a link.

Assume that the STA MLD will change the link mapping information of a specific TID. The STA MLD may transmit a TID-to-Link mapping request frame, which is an action frame including a TID-to-Link mapping element including link mapping information of a specific TID, to the AP MLD.

Here, after performing a TID-to-Link mapping operation according to the multi-link setup process, the action frame including the above element may be used only when the value of the subfield indicating whether a change (or update) to the current TID-to-Link mapping information is requested is set to 1 (i.e., if a change request is made to the current TID-to-Link mapping information). The corresponding subfield may be named a TID-to-Link mapping update subfield (or TID-to-Link re-mapping subfield, etc.), but is not limited thereto.

If the received TID-to-Link mapping change information requested by the element is confirmed and approved, the AP MLD may perform a TID-to-Link update operation. At this time, if the STA MLD's request to update the TID-to-Link mapping is a request that violates the basic requirements, the AP MLD may reject the request.

If the STA MLD requests an update in the manner described above (i.e., explicitly), the TID-to-Link mapping element may include only the link mapping subfield of the TID corresponding to the update requested by the STA MLD among the link mapping subfields of TID n. That is, the TID-to-Link mapping element may only include updates requested by the STA MLD (e.g., link mapping information of the TID requesting change).

For example, assume that the STA MLD will change the mapped link for TID 7 from Link 3 to Link 2. FIG. 20(*b*) shows that the value of the link mapping field of TID 7 among the link mapping fields of TID n is mapped to link 2, not link 3. That is, FIG. 20(*b*) shows a case where the 3rd bit value corresponding to link 3 is set to 0 and the 2nd bit value corresponding to link 2 is set to 1 in the link mapping field of TID 7.

At this time, the value of the link mapping existence indicator subfield in (b) of FIG. 20 may indicate that only link mapping information for TID 7 is included in the element. In the link mapping existence indicator subfield, only the 8th bit value corresponding to TID 7 may be set to 1.

That is, the TID-to-Link element may only include the link mapping field of TID 7. Accordingly, the link mapping presence indicator subfield includes only mapping information of TID n(s) to be changed, and the link mapping field of TID n may include only mapping change information of TID n to be applied to specific link(s).

Embodiment 3

Embodiment 3 is an additional or alternative embodiment of a method for changing information of a TID explicitly mapped to a link.

Assume that the STA MLD will change the link mapping information of a specific TID. The STA MLD may transmit a TID-to-Link mapping request frame, which is an action frame including a TID-to-Link mapping element including link mapping information of a specific TID, to the AP MLD.

Here, if the value of the TID-to-Link mapping update subfield within the corresponding TID-to-Link mapping element is set to 1, the AP MLD may recognize that the element is a request to update the STA MLD's current TID-to-Link mapping information. Here, after TID-to-Link mapping is completed during the multi-link setup process, the TID-to-Link mapping update subfield corresponds to a subfield indicating whether the STA MLD requests an update of the current TID-to-Link mapping information.

If the change request is confirmed and approved by comparing/analyzing the TID status mapped with the received element and the current links, the AP MLD may perform an update operation. At this time, if the STA MLD's update request for TID-to-Link mapping violates the basic requirements, the AP MLD may reject the update request.

If the STA MLD requests an update to the TID-to-Link mapping in the manner described above, the TID-to-Link mapping element may include TID information mapped to the current link and TID-to-Link mapping information to request change based on the TID information.

For example, assume that the STA MLD will change the link mapped for TID 7 from Link 3 to Link 2. STA MLD can transmit the TID-to-Link mapping element shown in (c) of FIG. 20 to AP MLD.

The AP MLD may confirm the value of the TID-to-Link mapping update subfield to recognize that the received TID-to-Link mapping element is a request for an update of TID-to-Link mapping information.

As shown in (c) of FIG. 20, among the link mapping fields of TID n, the link mapping field of TID 7 indicates that TID 7 is mapped to link 2, not link 3. That is, in the link mapping field of TID 7, the 3rd bit value corresponding to link 3 may be set to 0 and the 2nd bit value corresponding to link 2 may be set to 1.

At this time, the link mapping presence indicator subfield value shown in (c) of FIG. 20 may indicate that the corresponding element includes all TID-to-Link mapping information for TID 0 to TID 7, as shown in FIG. 19. In addition, the corresponding element may include link mapping fields (i.e., link mapping field of TID n) for all TIDS (i.e., TID 0 to TID 7).

AP MLD may confirm changes in the link mapping field value of TID 7 by comparing/analyzing the current TID-to-Link mapping information shown in FIG. 19 and the mapping information shown in (c) of FIG. 20. Afterwards, the AP MLD may perform an update operation on TID-to-Link information based on the confirmed changes. That is, the AP MLD may change the mapped link value for TID 7 for the STA MLD from link 3 to link 2.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

A method proposed by the present disclosure is mainly described based on an example applied to an IEEE 802.11-based system, 5G system, but may be applied to various WLAN or wireless communication systems other than the IEEE 802.11-based system.

What is claimed is:

1. A method performed by a station (STA) multi-link device (MLD), the method comprising:

receiving, by a first STA affiliated with the STA MLD from an access point (AP) MLD, a first frame including first information related to link mapping of a plurality of traffic identifiers (TIDs); and transmitting, by the first STA to the AP MLD, a second frame including second information related to whether to request an update to the link mapping of at least one TID among the plurality of TIDs and third information related to an update of the link mapping of the at least one TID, wherein, based on the at least one TID including TID m with an index m, the third information is based on a link mapping of TID m subfield included in a TID-to-link mapping element of the second frame, wherein a TID-to-link mapping control field of the TID-to-link mapping element includes a link mapping presence indicator subfield related to whether the link mapping of TID m subfield is present in the TID-to-link mapping element, and wherein based on the update of the link mapping of the TID m being approved by the AP MLD, the link mapping of the TID m is updated based on the third information.

2. The method of claim 1, wherein:

the second frame includes a TID-to-link mapping request frame, and the second information is indicated by the TID-to-link mapping control field of the TID-to-link mapping element included in the TID-to-link mapping request frame.

3. The method of claim 2, wherein:

the second information is configured on at least one bit among a 4th bit (B3) to an 8th bit (B7) of the TID-to-link mapping control field.

4. The method of claim 1, wherein:

link mapping information of the TID m included in the third information is different from link mapping information of the TID m included in the first information.

5. The method of claim 1, wherein:

based on the second information indicating a request for an update to the link mapping of the at least one TID, the link mapping presence indicator subfield indicates that a link mapping subfield of the at least one TID among the plurality of TIDs exists on the TID-to-link mapping element.

6. The method of claim 1, wherein:

the first frame includes fourth information indicating that link mapping for the plurality of TIDs is performed in a default TID-to-link mapping mode.

7. A first station (STA) affiliated with a STA multi-link device (MLD) comprising:

at least one transceiver; and at least one processor connected to the at least one transceiver, wherein the at least one processor is configured to:

receive, from an access point (AP) MLD through the at least one transceiver, a first frame including first information related to link mapping of a plurality of traffic identifiers (TIDs); and transmit, to the AP MLD through the at least one transceiver, a second frame including second information related to whether to request an update to the link mapping of at least one TID among the plurality of TIDs and third information related to an update of the link mapping of the at least one TID, wherein, based on the at least one TID including TID m with an index m, the third information is based on a link mapping of TID m subfield included in a TID-to-link mapping element of the second frame, wherein a TID-to-link mapping control field of the TID-to-link mapping element includes a link mapping presence indicator subfield related to whether the link mapping of TID m subfield is present in the TID-to-link mapping element, and wherein based on the update of the link mapping of the TID m being approved by the AP MLD, the link mapping of the TID m is updated based on the third information.

8. An access point (AP) affiliated with an AP multi-link device (MLD) comprising:

at least one transceiver; and at least one processor connected to the at least one transceiver, wherein the at least one processor is configured to:

transmit, to a station (STA) MLD through the at least one transceiver, a first frame including first information related to link mapping of a plurality of traffic identifiers (TIDs); and receive, from the STA MLD through the at least one transceiver, a second frame including second information related to whether to request an update to the link mapping of at least one TID among the plurality of TIDs and third information related to an update of the link mapping of the at least one TID, wherein, based on the at least one TID including TID m with an index m, the third information is based on a link mapping of TID m subfield included in a TID-to-link mapping element of the second frame, wherein a TID-to-link mapping control field of the TID-to-link mapping element includes a link mapping presence indicator subfield related to whether the link mapping of TID m subfield is present in the TID-to-link mapping element, and wherein based on the update of the link mapping of the TID m being approved by the AP MLD, the link mapping of the TID m is updated based on the third information.

* * * * *